United States Patent
Epitaux et al.

(10) Patent No.: US 10,466,433 B2
(45) Date of Patent: Nov. 5, 2019

(54) OPTICAL MODULE INCLUDING SILICON PHOTONICS CHIP AND COUPLER CHIP

(71) Applicant: Samtec, Inc., New Albany, IN (US)

(72) Inventors: Marc Epitaux, Gland (CH); Joshua R. Cornelius, Los Altos, CA (US); John L. Nightingale, Portola Valley, CA (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 16/016,979

(22) Filed: Jun. 25, 2018

(65) Prior Publication Data

US 2018/0306991 A1    Oct. 25, 2018

Related U.S. Application Data

(60) Continuation of application No. 15/893,778, filed on Feb. 12, 2018, now abandoned, which is a division of
(Continued)

(51) Int. Cl.
*G02B 6/42* (2006.01)
*G02B 6/36* (2006.01)
(Continued)

(52) U.S. Cl.
CPC ....... *G02B 6/4292* (2013.01); *G02B 6/12007* (2013.01); *G02B 6/138* (2013.01);
(Continued)

(58) Field of Classification Search
CPC ... G02B 6/3652; G02B 6/4214; G02B 6/4292
See application file for complete search history.

(56) References Cited

U.S. PATENT DOCUMENTS

| 7,046,881 B2 | 5/2006 | Sakuma et al. |
| 7,298,941 B2 * | 11/2007 | Palen ............ G02B 6/4206 264/1.1 |

(Continued)

FOREIGN PATENT DOCUMENTS

| TW | 201030402 A1 | 8/2010 |
| TW | I395978 B | 5/2013 |

OTHER PUBLICATIONS

Epitaux et al., "Optical Module Including Silicon Photonics Chip and Coupler Chip", U.S. Appl. No. 15/893,778, filed Feb. 12, 2018.
(Continued)

*Primary Examiner* — Daniel Petkovsek
(74) *Attorney, Agent, or Firm* — Keating & Bennett, LLP

(57) ABSTRACT

An optical module includes a Silicon Photonics chip that transports a light signal and a coupler chip that includes a waveguide and that is attached to the Silicon Photonics chip so that the light signal is transported along a light path between the Silicon Photonics chip and the coupler chip. The light path in the coupler chip includes a guided section that includes the waveguide that guides the light signal and an unguided section that does not guide the light signal in any other waveguide structure. The cross-sectional size of the beam defined by the light signal is largest at the interface between the Silicon Photonics chip and the coupler chip.

24 Claims, 30 Drawing Sheets

Related U.S. Application Data application No. 15/067,542, filed on Mar. 11, 2016, now abandoned.

(60) Provisional application No. 62/131,971, filed on Mar. 12, 2015, provisional application No. 62/131,989, filed on Mar. 12, 2015, provisional application No. 62/132,739, filed on Mar. 13, 2015, provisional application No. 62/134,166, filed on Mar. 17, 2015, provisional application No. 62/134,173, filed on Mar. 17, 2015, provisional application No. 62/134,229, filed on Mar. 17, 2015, provisional application No. 62/158,029, filed on May 7, 2015, provisional application No. 62/215,932, filed on Sep. 9, 2015.

(51) Int. Cl.
*G02B 6/12* (2006.01)
*G02B 6/138* (2006.01)
*G02B 6/293* (2006.01)
*G02B 6/122* (2006.01)
*G02B 6/124* (2006.01)

(52) U.S. Cl.
CPC ......... *G02B 6/2938* (2013.01); *G02B 6/3652* (2013.01); *G02B 6/4214* (2013.01); *G02B 6/124* (2013.01); *G02B 6/1228* (2013.01); *G02B 6/428* (2013.01)

(56) References Cited

U.S. PATENT DOCUMENTS

| | | | | |
|---|---|---|---|---|
| 7,627,213 | B2 | 12/2009 | Sugiyama | |
| 7,643,710 | B1 | 1/2010 | Liu | |
| 7,668,414 | B2 * | 2/2010 | Shemi | G02B 6/125 385/14 |
| 7,680,376 | B2 * | 3/2010 | Goebel | G02B 27/62 385/14 |
| 8,855,452 | B2 * | 10/2014 | Andry | G02B 6/4204 385/33 |
| 9,052,464 | B1 * | 6/2015 | Liao | G02B 6/30 |
| 9,151,916 | B2 * | 10/2015 | Pommer | G02B 6/4219 |
| 9,366,832 | B2 * | 6/2016 | Arao | G02B 6/4292 |
| 2006/0119956 | A1 | 6/2006 | Hashimoto | |
| 2013/0156366 | A1 * | 6/2013 | Raj | G02B 6/12004 385/14 |
| 2014/0086527 | A1 * | 3/2014 | Ban | G02B 6/30 385/33 |
| 2014/0294342 | A1 * | 10/2014 | Offrein | G02B 6/4214 385/14 |
| 2016/0161686 | A1 * | 6/2016 | Li | G02B 6/4214 385/92 |
| 2017/0207600 | A1 * | 7/2017 | Klamkin | H01S 5/02292 |

OTHER PUBLICATIONS

Official Communication issued in Taiwanese Patent Application No. 107111907, dated Mar. 5, 2019.

* cited by examiner

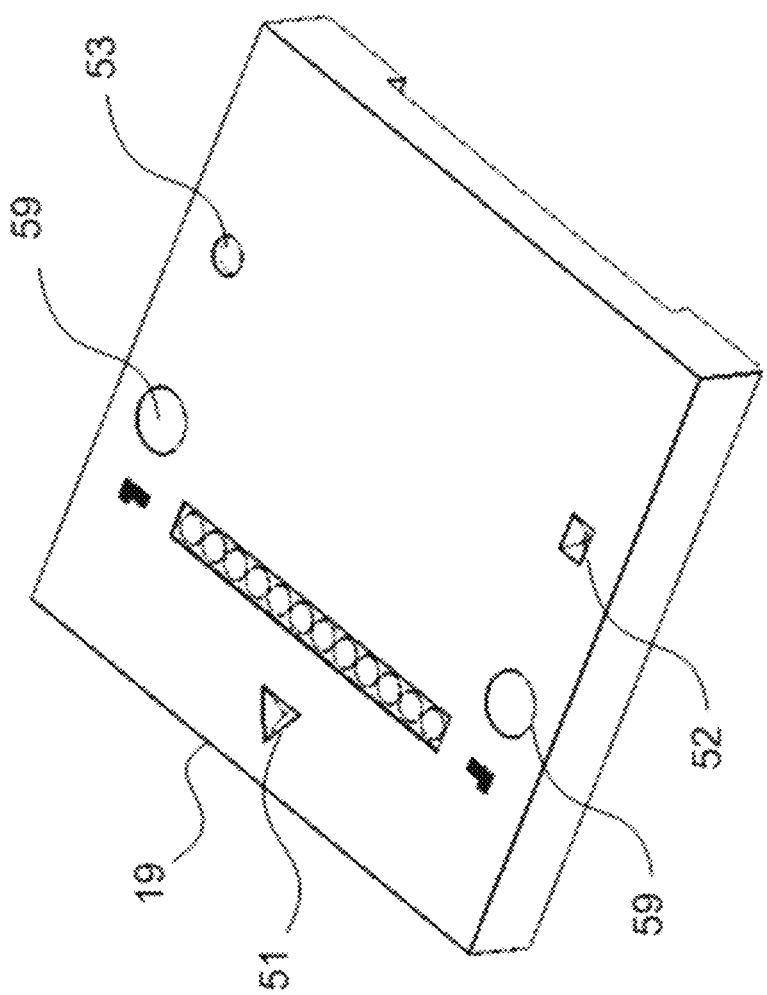

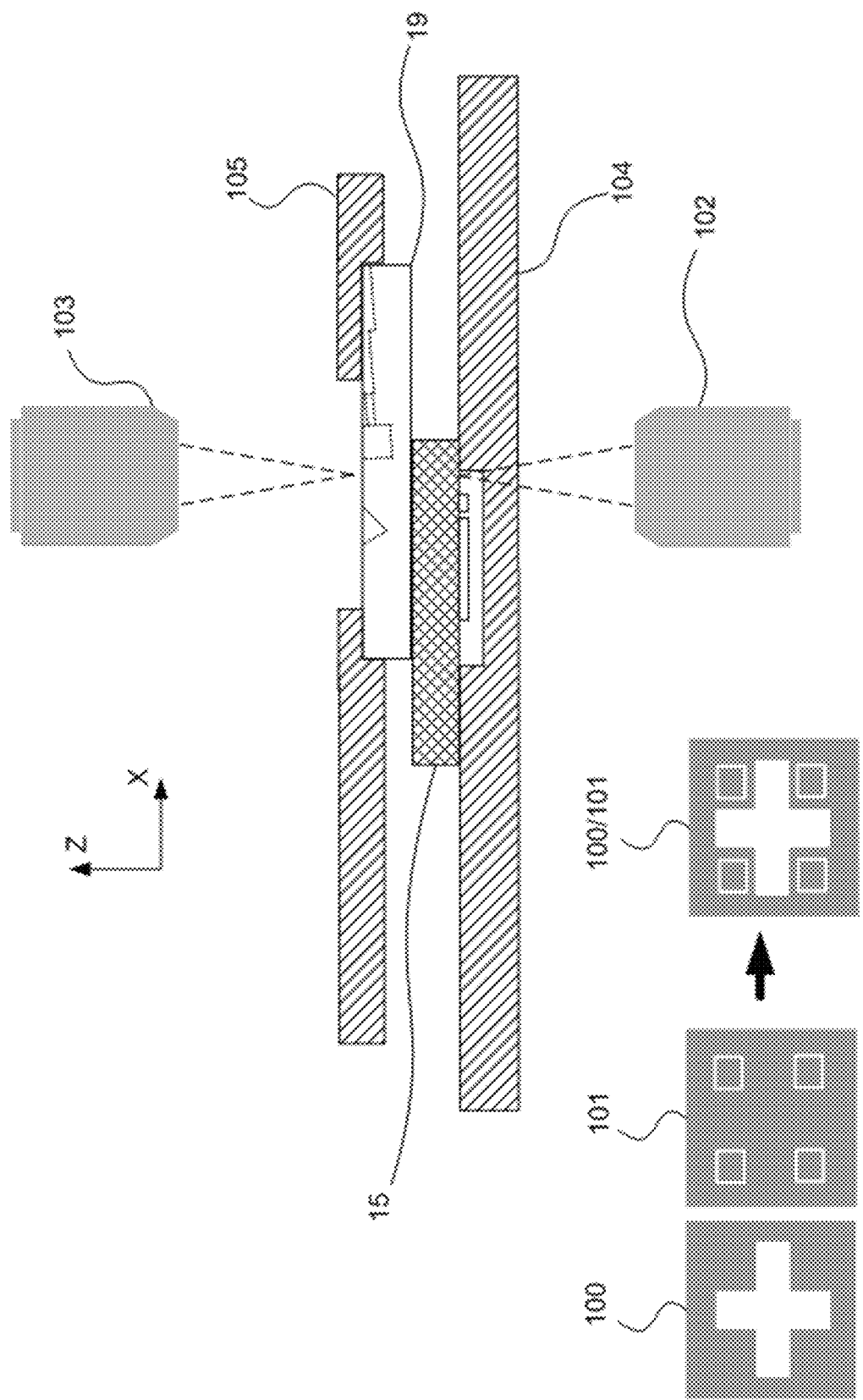

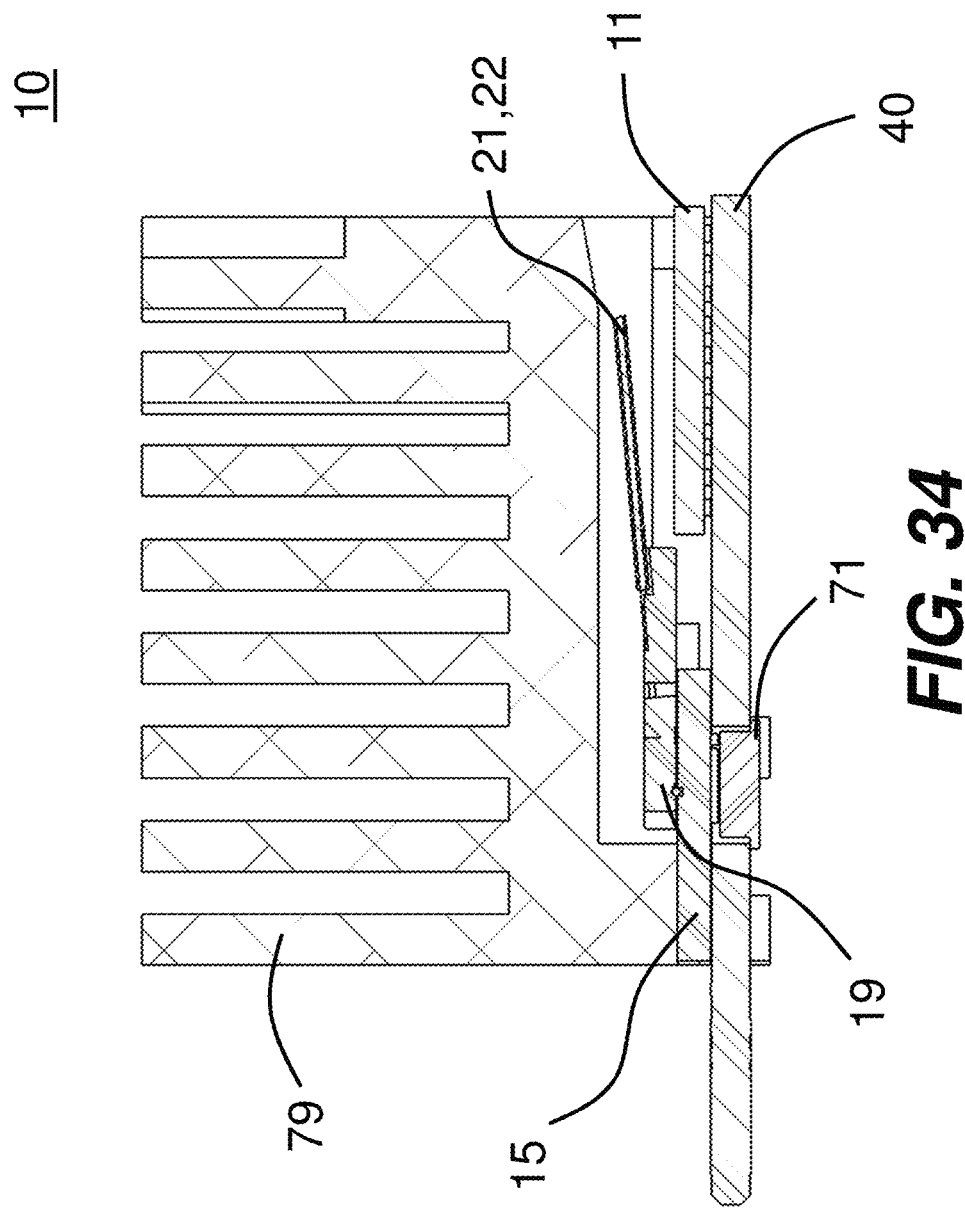

OPTICAL MODULE INCLUDING SILICON PHOTONICS CHIP AND COUPLER CHIP

RELATED APPLICATIONS

This application claims the benefit under 35 U.S.C. § 119(e) to U.S. Application No. 62/131,971 filed on Mar. 12, 2015; U.S. Application No. 62/131,989 filed on Mar. 12, 2015; U.S. Application No. 62/132,739 filed on Mar. 13, 2015; U.S. Application No. 62/134,166 filed on Mar. 17, 2015; U.S. Application No. 62/134,173 filed on Mar. 17, 2015; U.S. Application No. 62/134,229 filed on Mar. 17, 2015; U.S. Application No. 62/158,029 filed on May 7, 2015; and U.S. Application No. 62/215,932 filed on Sep. 9, 2015. The entire contents of each of U.S. Application Nos. 62/131,971; 62/131,989; 62/132,739; 62/134,166; 62/134,173; 62/134,229; 62/158,029; and 62/215,932 are hereby incorporated herein by reference.

BACKGROUND OF THE INVENTION

1. Field of the Invention

The present invention relates to optical modules. More specifically, the present invention relates to optical modules with Silicon Photonic devices.

2. Description of the Related Art

The use of optical interconnects, instead of electrical interconnects, enables a dramatic gain bandwidth and bandwidth density (Gb/s/m$^2$ of surface area occupied by a transceiver). Although optical interconnects are already present in the heart of telecommunication networks (transoceanic networks, metropolitan and access networks, etc.), they have not yet reached the level of integration and cost and energy efficiency sufficient to supplant electrical interconnects on short links. Optical interconnects based on vertical cavity surface emitting lasers (VCSELs) are, for example, still ten times more expensive than electrical interconnects. The idea of applying high-volume manufacturing techniques and low-cost electronics manufacturing processes has led to the development of integrating Photonic functions into Silicon substrates. The infrastructure and know-how used to fabricate electronic integrated circuits can be applied to Photonic integrated circuits, dramatically reducing their cost.

While much development effort has focused on integrating Photonic functions in Silicon, less effort has been devoted to coupling light from a Silicon Photonic element to an optical fiber. Many prior art optical modules, using discrete components or integrated circuits, are equipped with fiber pigtails and use an active alignment process to align the fiber with laser sources or photodetectors. The alignment process often relies on dynamic or active (e.g. with power or photocurrent feedback) alignment using a multi-axis robot. Once an optimal coupled signal is obtained, the fiber is fixed using laser welding or UV (ultraviolet light induced) curing. The optical fiber can be either butt coupled to a device or fixed in a focal plane with micro-lenses used to couple light into/out of the optical fiber.

Active alignment suffers from several drawbacks. It is a unitary process with a process time of about 1 minute/part, and it is not scalable to high numbers of optical ports. The expense associated with coupling light into and out of a Silicon Photonics element has limited commercial viability for optically based short links. There is a need for a robust, low-cost method of coupling light into and out of a Silicon Photonics element.

Similar to the situation in long-haul telecommunication, the use of wavelength-division multiplexing (WDM) for optical interconnect is very compelling because it reduces the number of fibers, fiber alignments, and costs associated with routing fibers. WDM technology multiplexes a number of optical signals at different wavelengths onto a single optical fiber. For example, a coarse WDM system in the O-band can use four channels with wavelengths of approximately 1271 nm, 1291 nm, 1311 nm, and 1331 nm. WDM enables each of these four channels to be simultaneously transported over one strand of optical fiber increasing the available per-fiber bandwidth. To use WDM, multiplex/demultiplex must be provided at the ends of the optical link to combine/separate the various wavelength channels. There is a need for a robust, low-cost method of integrating multiplexing/demultiplex capability with a Silicon Photonics element.

SUMMARY OF THE INVENTION

To overcome the problems described above, preferred embodiments of the present invention provide an optical module that includes one or more of the following:
1) kinematic alignment that includes first, second, and third alignment protrusions and corresponding point, linear, and planar contacts;
2) a coupler chip that changes the cross-sectional size of a beam defined by the light signals;
3) a coupler chip that includes a multiplexer, a demultiplexer, or both a multiplexer and a demultiplexer;
4) a spacer attached to a Silicon Photonics chip, in which the spacer can be anodically bonded to the Silicon Photonics chip;
5) an arrangement in which the cross-sectional size of a beam defined by the light signals is preferably largest at an interface between the Silicon Photonics chip and the coupler chip;
6) an arrangement in which the cross-sectional size of a beam defined by the light signals is different at the first and second surfaces of the coupler chip;
7) a waveguide interconnect that includes a spot-size-converter region;
8) a waveguide interconnect that is obliquely angled with respect to the Silicon Photonics chip;
9) a coupler chip and a Silicon Photonics chip anodically bonded together; and
10) a photodetector surface mounted to the Silicon Photonics chip.

Preferred embodiments of the present invention also provide a transceiver with a latch that allows the waveguide interconnect to be detachable, provide a method of aligning two substrates using fiducials that are located on surfaces of the two substrates that are not facing each other, and provide methods of manufacturing optical modules.

According to a preferred embodiment of the present invention, an optical module includes a waveguide interconnect that transports light signals; a Silicon Photonics chip that modulates the light signals, detects the light signals, or both modulates and detects the light signals; a coupler chip attached to the Silicon Photonics chip and the waveguide interconnect so that the light signals are transported along a light path between the Silicon Photonics chip and the waveguide interconnect; and one of the Silicon Photonics chip and the coupler chip includes first, second, and third alignment protrusions. The other of the coupler chip and the Silicon Photonics chip includes a point contact, a linear contact, and a planar contact. The point contact provides no movement for the first alignment protrusion. The linear contact provides linear movement for the second alignment protrusion. The planar contact provides planar movement for the third alignment protrusion.

Preferably, the first, second, and third alignment protrusions are spherical balls made of glass that are located in inverted pyramids provided in the one of the Silicon Photonics chip and the coupler chip. The optical module further preferably includes a spacer attached to the Silicon Photonics chip. The spacer and the Silicon Photonics chip are preferably anodically bonded together.

A cross-sectional size of a beam defined by the light signals is preferably largest at an interface between the Silicon Photonics chip and the coupler chip. A cross-sectional size of a beam defined by the light signals preferably increases initially along the light path and then decreases along the light path.

At least one of the Silicon Photonics chip and the coupler chip preferably includes a focusing element. The focusing element is preferably a collimating lens. The waveguide interconnect is preferably detachable from the optical module. The waveguide interconnect includes a spot-size-converter region. The Silicon Photonics chip preferably includes a photodetector mounted on a surface of the Silicon Photonics chip. The Silicon Photonics chip and the coupler chip preferably include fiducials on surfaces that do not face each other.

The coupler chip preferably includes a borosilicate glass having a coefficient of thermal expansion substantially similar to silicon.

According to a preferred embodiment of the present invention, a transceiver includes an optical module according to various preferred embodiments of the present invention and a printed circuit board. The Silicon Photonics chip is connected to the printed circuit board.

The transceiver further preferably includes a housing enclosing the Silicon Photonics chip and the coupler chip. The transceiver further preferably includes a latch that secures the coupler chip in the housing, where the coupler chip is detachable from the housing by unlatching the latch.

According to a preferred embodiment of the present invention, an optical module includes a Silicon Photonics chip that includes a waveguide that transports light signals and a coupler chip attached to the Silicon Photonics chip so that the light signals are transported along a light path between the Silicon Photonics chip and the coupler chip. The coupler chip changes a cross-sectional size of a beam defined by the light signals, and the coupler chip includes a multiplexer, a demultiplexer, or both a multiplexer and a demultiplexer.

The multiplexer, the demultiplexer, or both the multiplexer and the demultiplexer preferably include an Echelle grating, an arrayed waveguide grating, a direction coupler, a dichroic filter, or a resonant interference filter. The cross-sectional size of the beam is preferably largest at an interface between the Silicon Photonics chip and the coupler chip. The cross-sectional size of the beam preferably increases initially along the light path and then decreases along the light path. Preferably, a photodetector is surface mounted to the Silicon Photonics chip or is included within the Silicon Photonics chip. A light source is preferably included within the Silicon Photonics chip. The optical module further preferably includes a light source located outside of the Silicon Photonics chip, where light from the light source is supplied to the Silicon Photonics chip. The Silicon Photonics chip preferably includes a via in the light path. The Silicon Photonics chip and the coupler chip are preferably anodically bonded to each other. The coupler chip preferably includes a borosilicate glass having a coefficient of thermal expansion substantially similar to silicon.

According to a preferred embodiment of the present invention, an optical module includes a Silicon Photonics chip that includes a waveguide that transports light signals and a coupler chip attached to the Silicon Photonics chip so that the light signals are transported along a light path between the Silicon Photonics chip and the coupler chip. The light path includes a first surface of the coupler chip and a second surface of the coupler chip. A cross-sectional size of a beam defined by the light signals is different at the first and second surfaces.

At least one of the Silicon Photonics chip and the coupler chip preferably includes a focusing element. The focusing element is preferably a collimating lens. The coupler chip preferably includes a borosilicate glass having a coefficient of thermal expansion substantially similar to silicon.

According to a preferred embodiment of the present invention, a method of aligning two substrates includes providing a first substrate with a first fiducial and a second substrate with a second fiducial, the first and second fiducials are located on surfaces of the first and second substrates that are not facing each other; providing first and second cameras that are opposed to each other such that the first camera views the first fiducial and the second camera views the second fiducial; and aligning the first and second substrates by aligning the first and second fiducials using the first and second cameras.

According to a preferred embodiment of the present invention, an optical module includes a Silicon Photonics chip that includes a waveguide that transports light signals and a coupler chip attached to the Silicon Photonics chip so that the light signals are transported along a light path between the Silicon Photonics chip and the coupler chip. The coupler chip changes a cross-sectional size of a beam defined by the light signals. The cross-sectional size of the beam is largest at an interface between the Silicon Photonics chip and the coupler chip.

According to a preferred embodiment of the present invention, an optical module includes a waveguide interconnect that transports light signals; a Silicon Photonics chip that modulates the light signals, detects the light signals, or both modulates and detects the light signals; and a coupler chip attached to the Silicon Photonics chip and the waveguide interconnect so that the light signals are transported along a light path between the Silicon Photonics chip and the waveguide interconnect. The waveguide interconnect includes a spot-size-converter region in which a cross-sectional size of a beam defined by the light signals changes.

According to a preferred embodiment of the present invention, an optical module includes a Silicon Photonics chip that includes a waveguide that transports light signals and a coupler chip attached to the Silicon Photonics chip so that the light signals are transported along a light path between the Silicon Photonics chip and the coupler chip. The coupler chip changes a cross-sectional size of a beam defined by the light signals. The coupler chip and the Silicon Photonics chip are anodically bonded together.

According to a preferred embodiment of the present invention, an optical module includes a waveguide interconnect that transports light signals; a Silicon Photonics chip that modulates the light signals, detects the light signals, or both modulates and detects the light signals; and a coupler chip attached to the Silicon Photonics chip and the waveguide interconnect so that the light signals are transported along a light path between the Silicon Photonics chip and the waveguide interconnect. The waveguide interconnect is obliquely angled with respect to the Silicon Photonics chip.

According to a preferred embodiment of the present invention, a transceiver includes a printed circuit board, an optical module including a waveguide interconnect that transports light signals; a Silicon Photonics chip that is connected to the printed circuit board and that modulates the light signals, detects the light signals, or both modulates and detects the light signals; a coupler chip attached to the Silicon Photonics chip and the waveguide interconnect so that the light signals are transported along a light path between the Silicon Photonics chip and the waveguide interconnect; and a housing enclosing the Silicon Photonics chip and the coupler chip. The coupler chip is secured in the housing with a latch. The coupler chip is detachable from the housing by unlatching the latch.

According to a preferred embodiment of the present invention, an optical module includes a Silicon Photonics chip that includes a waveguide that transports light signals, a coupler chip attached to the Silicon Photonics chip so that the light signals are transported along a light path between the Silicon Photonics chip and the coupler chip, and a photodetector surface mounted to the Silicon Photonics chip.

According to a preferred embodiment of the present invention, a method of manufacturing an optical module includes providing a wafer with a photonic layer, singulating the wafer to form a SiPho chip, mating the SiPho chip with a printed circuit board, mating a coupler chip with the SiPho chip, and mounting a waveguide interconnect to the coupler chip.

According to a preferred embodiment of the present invention, a method of manufacturing an optical module includes providing a wafer of SiPho chips, mating coupler chips with the SiPho chips on the wafer, singulating the wafer to form SiPho chip/coupler chip assemblies, mating the SiPho chip/coupler chip assemblies with printed circuit boards, and mounting waveguide interconnects to the coupler chips.

According to a preferred embodiment of the present invention, a coupler chip used to optically connect an optical channel of a Silicon Photonics chip to a waveguide interconnect includes an optical waveguide that transports light signals through the coupler chip. The optical waveguide is preferably made of a laser-processed material produced using ultrashort laser pulses, for example.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIGS. 17 and 18 show a kinematic alignment arrangement.

FIGS. 19 and 20 show a vision-assisted alignment arrangement.

FIG. 34 shows another example of a transceiver.

DETAILED DESCRIPTION OF PREFERRED EMBODIMENTS

Figure 1:
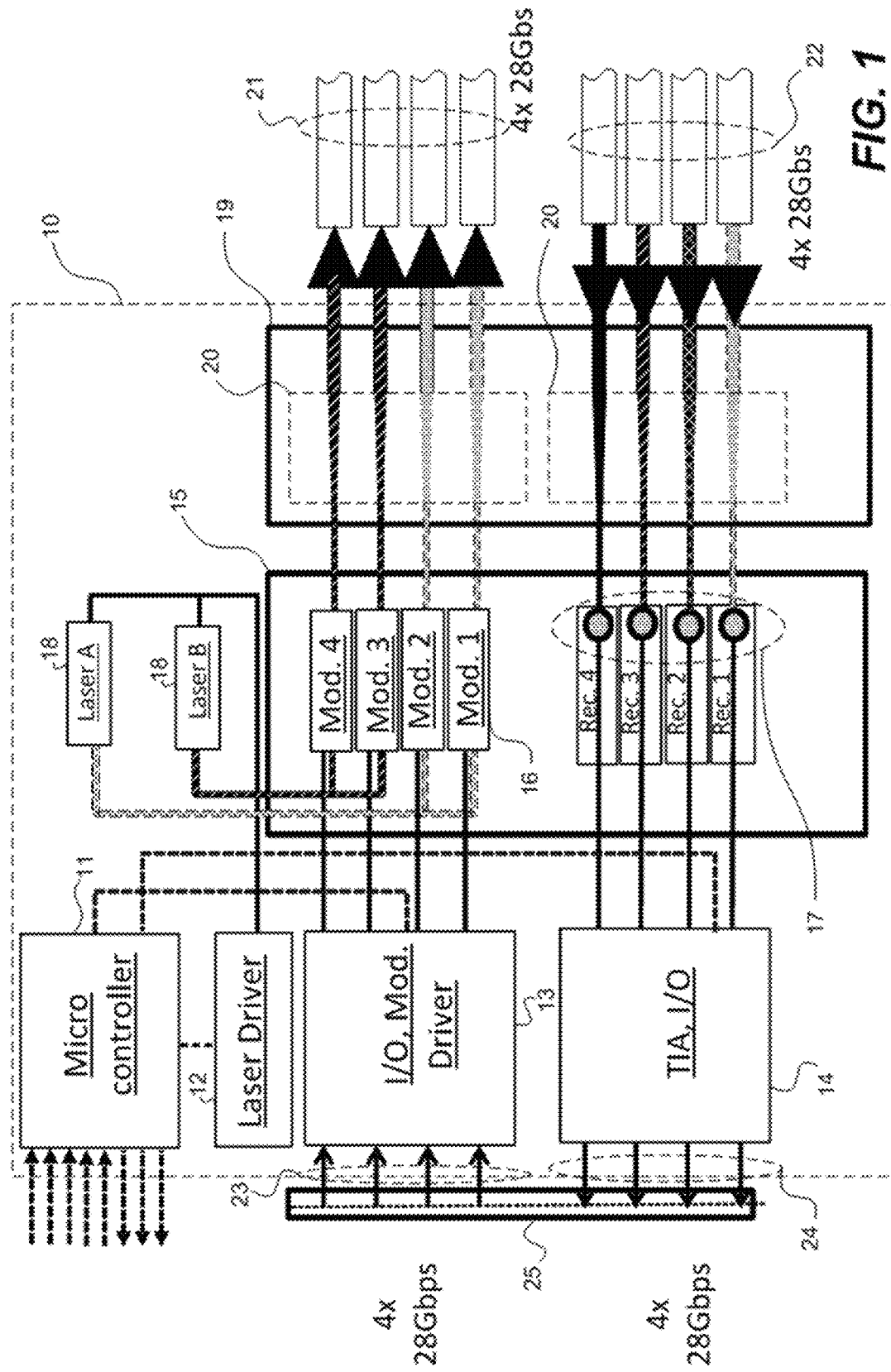
FIG. 1 is a block diagram of a Silicon Photonics system according to a preferred embodiment of the present invention.

FIG. 1 shows a Silicon Photonics (SiPho) system according to a preferred embodiment of the present invention. Transceiver 10 includes a microcontroller 11 that is connected to laser driver 12, modulator driver 13, and transimpedance amplifier (TIA) 14. The microcontroller 11 receives and sends electrical auxiliary signals, including, for example, control and monitoring signals, from and to one or more devices external to the SiPho system as shown by the arrows on the right-hand side of microcontroller 10. The modulator driver 13 receives electrical data signals through transmission (Tx) inputs 23, and the TIA 14 outputs electrical data signals through reception (Rx) outputs 24. The Tx inputs 23 and the Rx outputs 24 are preferably included in connector 25. The lasers A, B (labeled as reference number 18) are connected to a laser driver 12. The transceiver 10 also includes a Silicon Photonics (SiPho) chip 15 and a coupler chip 19. The coupler chip 19 is connected to Tx waveguide interconnects 21 and Rx waveguide interconnects 22.

A channel is defined by a single path along which signals are transported, i.e., transmitted and/or received. For example, one transmission channel is defined by the electrical data signals received by the modulator driver 13 from the topmost Tx input 23 that causes modulator 4 to modulate the light from laser B and by the modulated light from modulator 4 that enters the topmost Tx waveguide interconnect 21 through the coupler chip 19. In this example of a transmission channel, the transmission channel includes both electrical and optical data signals. A corresponding reception channel is defined by the optical data signal received by the coupler chip 19 on the bottommost Rx waveguide interconnect 22 that causes the bottom receiver 1 to generate an electrical data signal and by a corresponding electrical data signal from the bottommost receiver 1 that is supplied to the bottommost Rx output 24 by the TIA 14, in which the corresponding electrical data signal is based on the generated electrical data signal received by the TIA 14.

The microcontroller 11 can be any suitable microcontroller, microprocessor, central processing unit, field-programmable gate array, application-specific integrated circuit, etc. More than one microcontroller 11 could be used. The microcontroller 11 can be a discrete part or can be integrated with the SiPho chip 15. Integrating microcontroller 10 with the SiPho chip 15 will likely increase the cost, complexity, and size of the SiPho chip 15.

Although two lasers 18 are shown in FIG. 1, any suitable number of lasers can be used. In FIG. 1, laser A is connected to modulators 1, 2 (for clarity, only modulator 1 is labeled as reference number 16), and laser B is connected to modulators 3, 4. However, one laser 18 could be connected to each of the modulators 1-4 if the one laser 18 had enough power for each of the channels, or four lasers 18 could be connected to the modulators 1-4 so that one laser is used for each channel. If more than one laser 18 is used, the lasers 18 can provide different wavelengths of light so that different channels use different wavelengths of light.

Lasers 18 can be edge emitters or vertical-cavity surface-emitting lasers (VCSELs), for example. The lasers 18 can be mounted:
1) external to the transceiver 10, in which the light from the laser could be supplied to the SiPho chip 15 using a waveguide interconnect and possibly the coupler chip 19;
2) on a printed circuit board (PCB) with the other components of the transceiver 10, including, e.g., the microcontroller 11, laser driver 12, modulator driver 13, TIA 14, SiPho chip 15, coupler chip 19, etc., in which the light from the lasers 18 can be coupled to the SiPho chip 15 by embedded organic waveguides in the PCB; or
3) integrated with the SiPho chip 15, examples of which include a micro-packaged laser that is usually made with a MEMS Silicon enclosure that contains a distributed feedback laser (DFB laser), an optical ball lens, and an isolator; a flip-chipped p-down which is a SOA (Semiconductor Optical Amplifier), DFB or Fabry-Perot semiconductor laser chip that can be mounted with flip-chip technology; or a heterogeneous integrated laser that usually includes a III-V quantum gain structure that creates light that is coupled and confined to the Silicon waveguide underneath.

Because the laser's 18 performance is temperature sensitive, it can be beneficial, in some applications, to mount the laser 18 external to the SiPho chip 15, either on the PCB with the other components or external to the transceiver 10.

The laser driver 12 can be mounted within the transceiver 10, including, for example, near or on the SiPho chip 15, or can be mounted outside of the transceiver 10, for example, on a host PCB (not shown in FIG. 1).

Modulator driver 13 receives electrical data signals from Tx inputs 23 and creates a corresponding amplified electrical signal by turning a corresponding modulator 16 off and on, which creates an optical data signal with high and low signals. The modulator driver 13 can be a single device as shown in FIG. 1 that is provided for all of the channels, or the modulator driver 13 can be a set of devices, with one device for each channel. Because the modulators 16 can be turned off and on faster than the lasers can be turned on and off, optical signals generated using the modulators 16 can achieve high frequencies.

TIA 14 is controlled by the microcontroller 11 and receives a signal from photodetectors 1-4 (for clarity, the receivers 1-4 are labelled as reference number 17). Typically, the signal is a current signal whose magnitude is based on the amount of light detected by the receivers 17, and the TIA 14 converts the current signal into a voltage signal. The TIA 14 can be a single device as shown in FIG. 1 that is provided for all of the channels, or the TIA 14 can be a set of devices, with one device for each channel.

Figure 11:
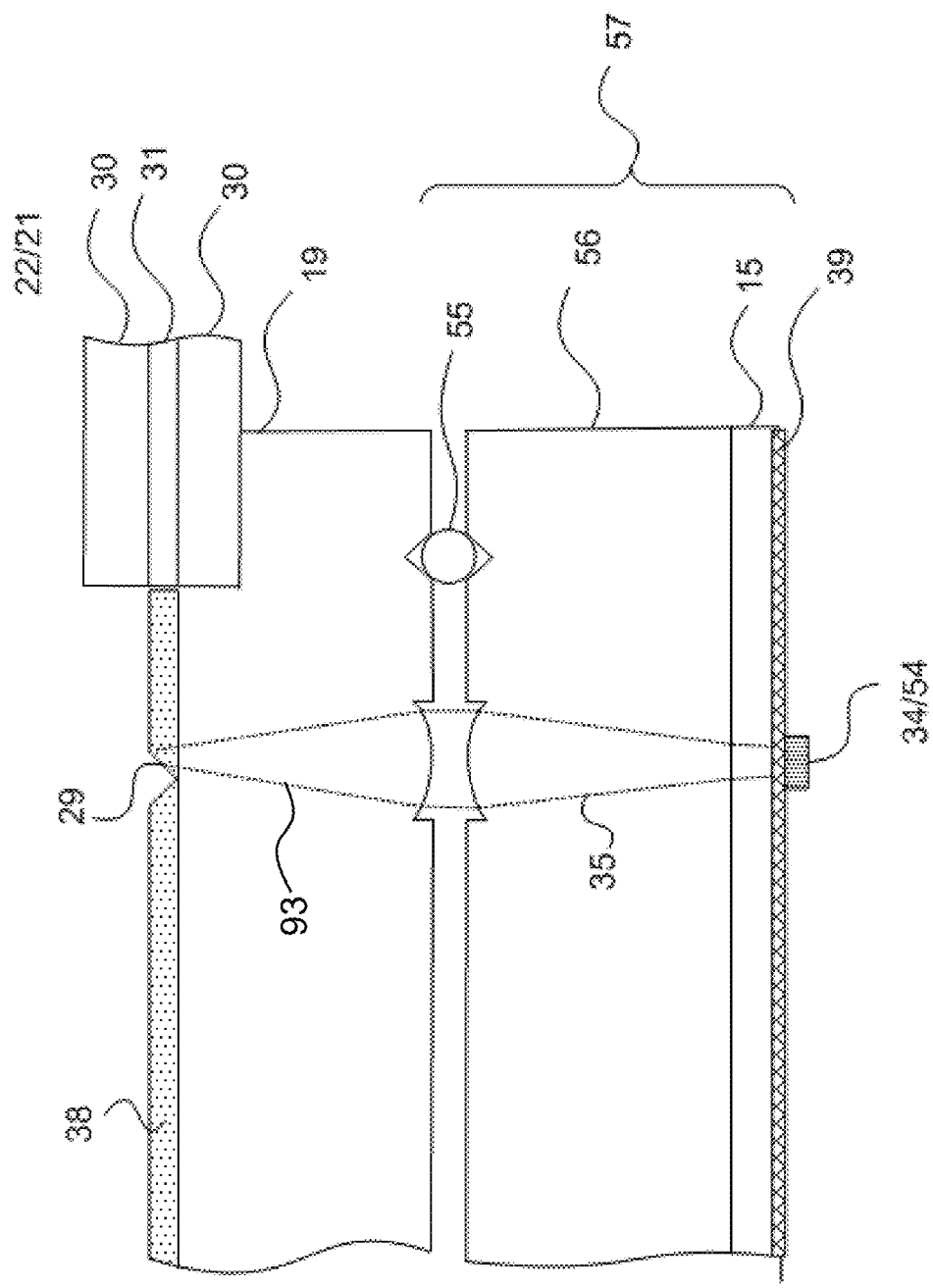
FIGS. 11 and 12 show hybrid SiPho chips with a spacer.
Figure 12:
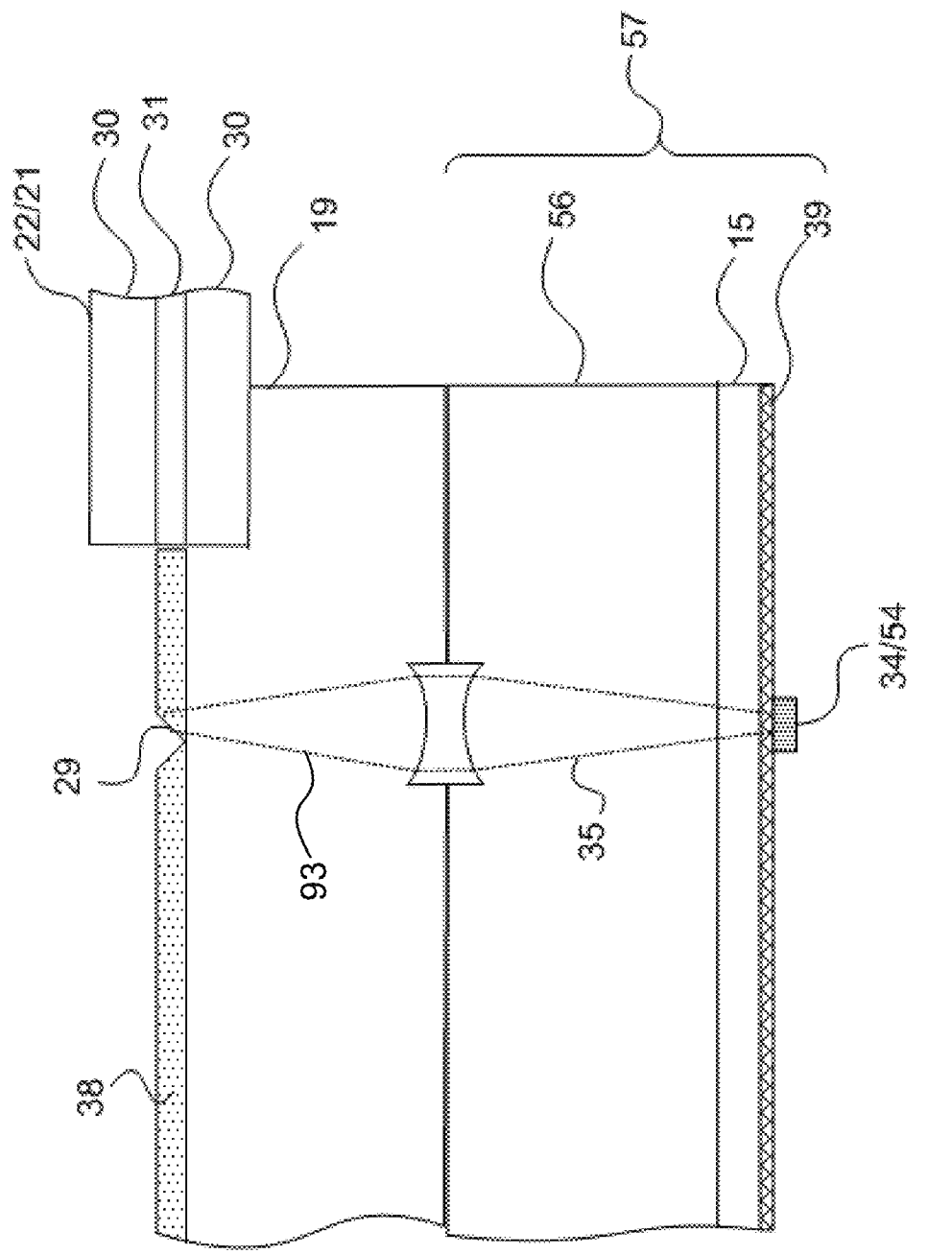

The SiPho chip 15 is preferably an optical device made of Silicon; however, other suitable materials could also be used, such as, for example, InP or lithium niobate. SiPho chip 15 includes any portion of a Silicon wafer that has the ability to transmit, control, and/or detect light. These functions of the SiPho chip 15 include modulation, detection, guiding, MUX/DEMUX etc. The SiPho chip 15 can also be a hybrid chip made with Silicon and glass bonded together as shown in FIGS. 11 and 12. The SiPho chip 15 typically includes waveguides (not shown) that manipulate the light and modulators 16 that are used to create optical signals. The cross-sectional dimensions of a typical waveguide in a SiPho chip 15 are currently about 0.3 µm×0.3 µm; however, other suitable sizes could also be used. In some preferred embodiments of the present invention, the SiPho chip 15 can include waveguides formed in a Silicon nitride stripe embedded in a Silicon dioxide matrix. Such waveguides typically have a larger mode size due to the smaller refractive index difference between Silicon nitride and Silicon dioxide.

The coupler chip 19 is a device that transports optical signals between the SiPho chip 15 and the waveguide interconnects 21, 22. The coupler chip 19 can be any device that provides an optical path between the SiPho chip 15 and the waveguide interconnect(s) 21, 22. The coupler chip 19 can have passive optical functionality, including, for example, MUX/DEMUX. The coupler chip 19 can change the direction of the light and can change the mode size of the light. For example, if the SiPho chip 15 emits light vertically or near vertically, then the coupler chip 19 can redirect the vertical light so that it propagates in a horizontal direction or near horizontal direction. The mode converters 20 can change the mode size of the light, which can provide efficient coupling at the various optical interfaces, while maintaining alignment tolerances at those interfaces. For example, light emitted from the SiPho chip 15 can have a cross-sectional mode size of 0.3 µm×0.3 µm, and the diameter of the cross-sectional mode size of the waveguide interconnect can be 9 µm for a single mode fiber. The mode converter 20 can change the cross-sectional size of the emitted light to match or nearly match the cross-sectional size of the waveguide interconnect 21, 22. A mode converter 20 might not be necessary for an Rx channel because light does not need to be mode matched into the photodetector, i.e. the photodetector can efficiently detect light even if the cross-sectional size of the light is smaller than the photodetector. The coupler chip 19 can be made of Silicon, glass, or both Silicon and glass where the Silicon and glass are anodically bonded together. The coupler chip 19 is preferably made of a material with a coefficient of thermal expansion substantially similar to the coefficient of thermal expansion as the SiPho chip 15 so that during operation the two devices will stay aligned as the temperature of the transceiver 10 increases and will not bend or twist (or the bending and twisting will be significantly reduced or minimized). The coefficients of thermal expansion of the coupler chip 19 and the SiPho chip 15 are substantially similar if they are within +/−30%.

In FIG. 1, the transceiver 10 includes four transmission channels with four corresponding Tx waveguide interconnects 21 and includes four reception channels with four corresponding Rx waveguide interconnects 22. However, any suitable number of channels can be included. For example, the transceiver 10 can include one, six, eight, or twelve Tx waveguide interconnects 21 and corresponding one, six, eight, or twelve Rx waveguide interconnects 22. Instead of transceiver 10, a transmitter with only one or more Tx waveguide interconnects 21 could be used, or a receiver with only one or more Rx waveguide interconnects 22 could also be used.

Figure 21:
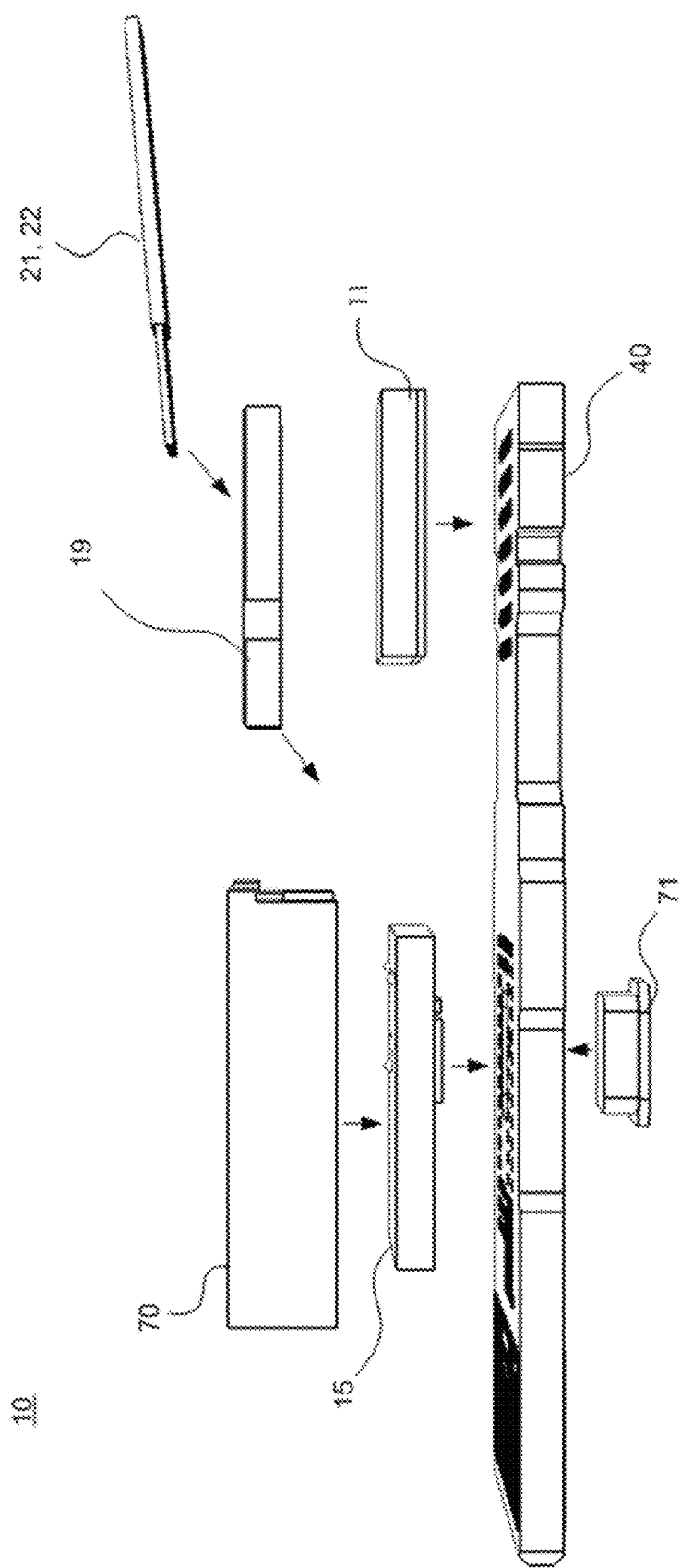
FIGS. 21 and 22 show an example of a transceiver.
Figure 22:
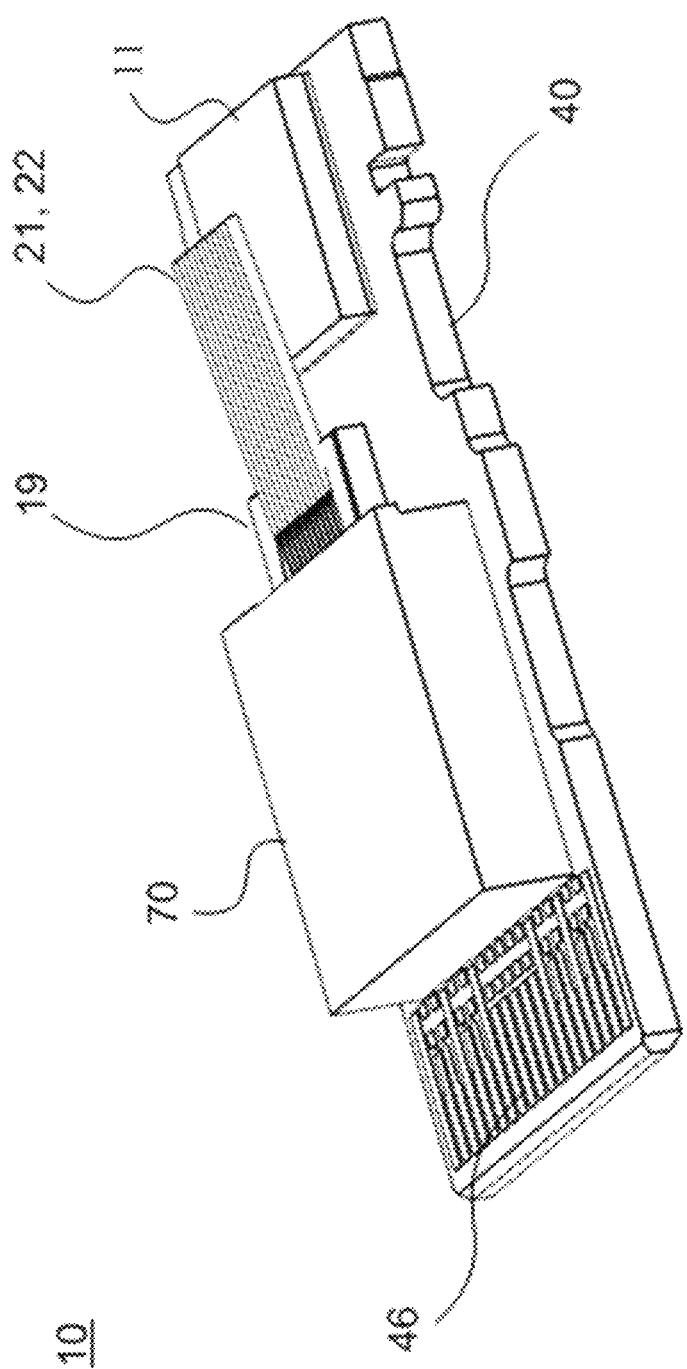
Figure 23:
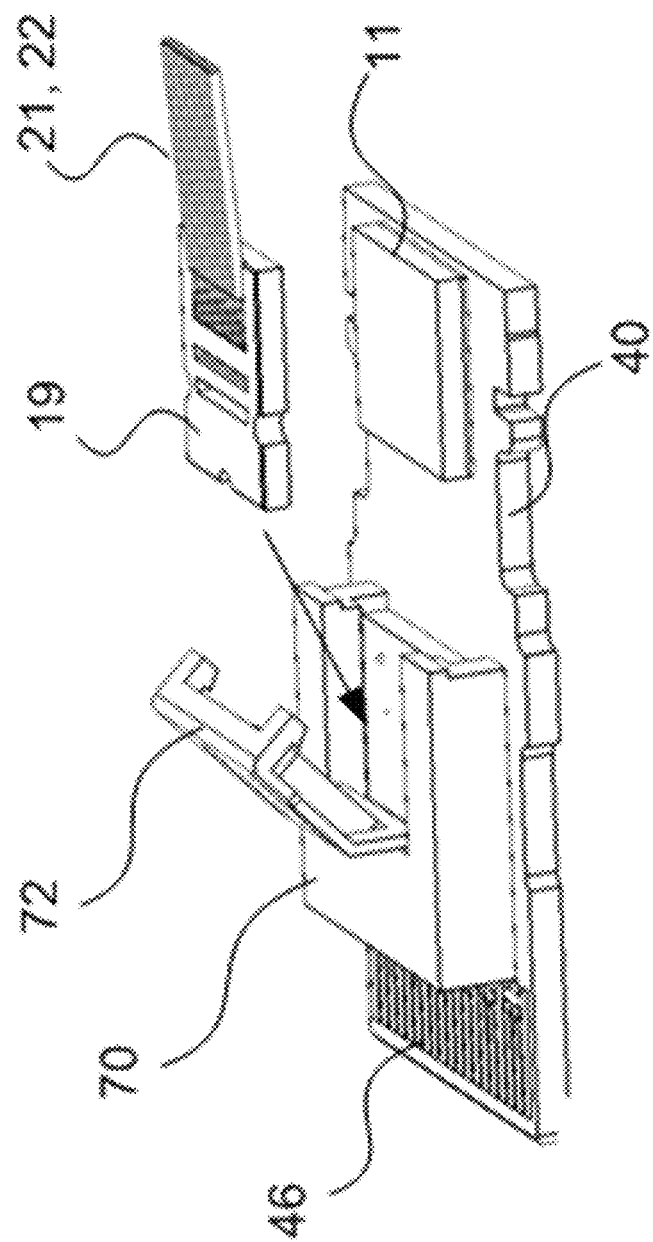
FIGS. 23 and 24 show another example of a transceiver.
Figure 24:
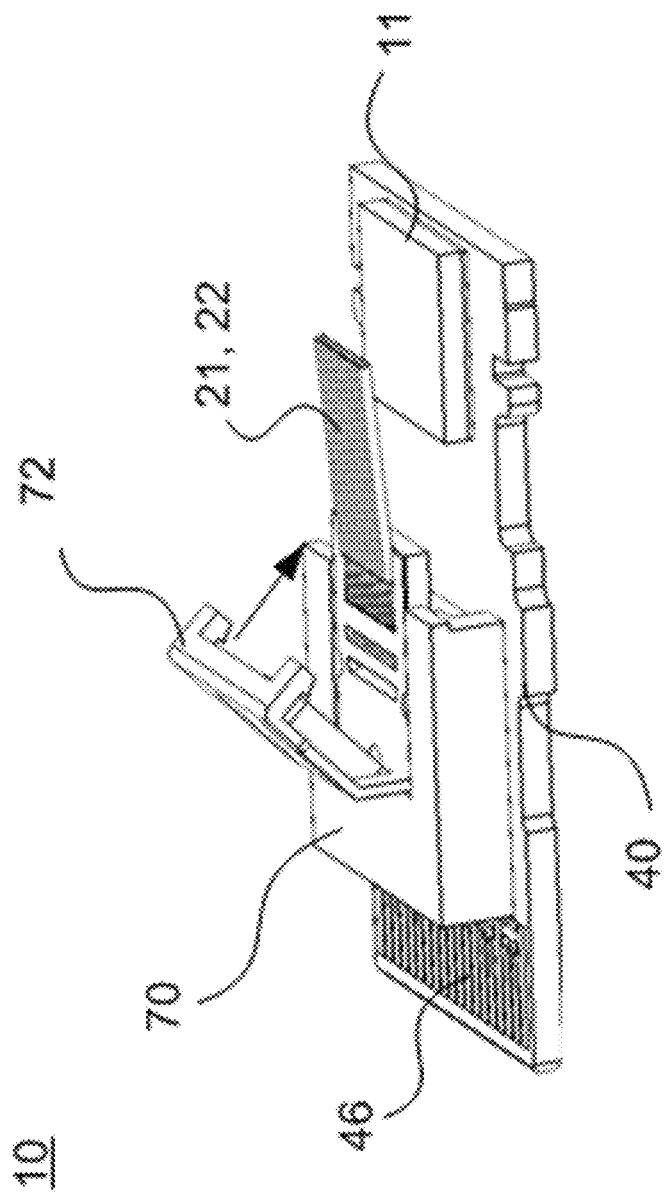

The waveguide interconnects 21, 22 are preferably optical fibers. The optical fibers can be individual optical fibers or can be an array of optical fibers arranged in a bundle or a ribbon. The waveguide interconnects 21, 22 can also be a flexible, polymer-based waveguide ribbon or an interposer chip of Silicon or some other suitable material. Optical fibers typically include a core 31 surrounded by a cladding 30, as shown, for example, in FIG. 5. The optical fibers can be single mode or multimode. A core of a single-mode optical fiber can have a cross-sectional size of about 9 µm, while a core of a multimode optical fiber can have a cross-sectional size of about 50 µm or about 62.5 µm, for example. The optical fibers can be permanently attached to the transceiver 10 (i.e., pigtailed optical fibers) as shown in FIGS. 21 and 22 or can be detachable from the transceiver (i.e., connecterized optical fibers) as shown in FIGS. 23 and 24.

The connector 25 can be any suitable connector, including, for example, a UECS connector from Samtec, Inc. of New Albany, Ind. It is possible to use more than one connector 25. A single connector 25 can be used to house both the Tx inputs 23 and Rx outputs 24, or one connector can be used for Tx inputs 23 and another connector can be used for Rx outputs 24.

The transceiver 10 of the preferred embodiments of the present invention can be implemented in a transceiver similar to those transceivers disclosed in U.S. application Ser. Nos. 13/539,173, 13/758,464, 13/895,571, 13/950,628, and 14/295,367, the entire contents of which applications are hereby incorporated herein by reference. Instead of using the optical engines disclosed in these applications, the transceiver 10 may use a Silicon-photonic-based optical engine, which allows for smaller sizes, higher speeds, larger bandwidth, higher efficiency, and longer signal travel distances. Although not shown in FIG. 1, the transceiver 10 can include one or more heat sinks connected to the various components of the transceiver 10 to dissipate heat.

Figure 2:
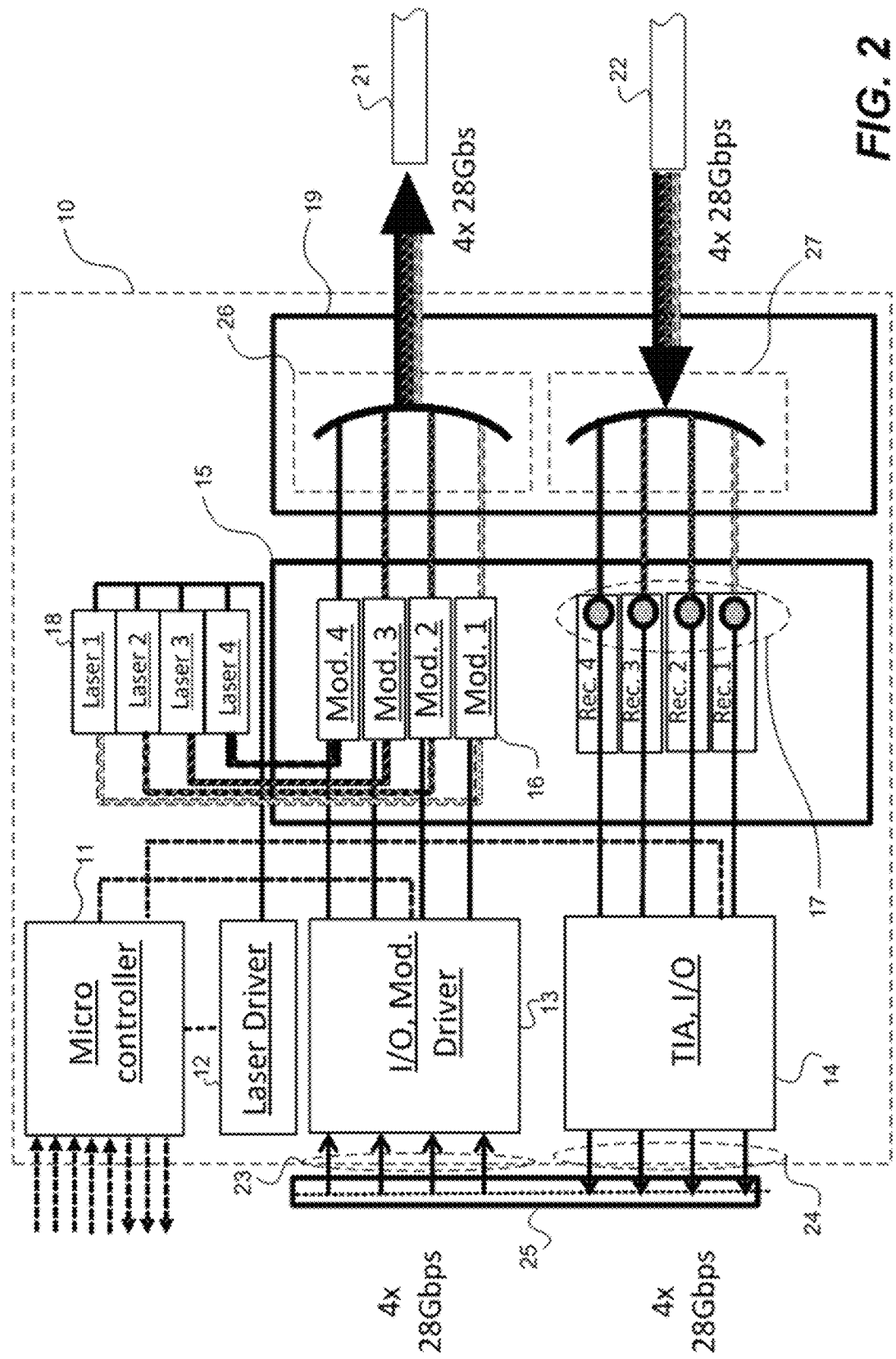
FIG. 2 is a block diagram of another Silicon Photonics system according to a preferred embodiment of the present invention.

FIG. 2 shows another Silicon Photonics system according to a preferred embodiment of the present invention. The Silicon Photonics system in FIG. 2 is similar to the Silicon Photonics system in FIG. 1, with similar elements being labeled with the same reference numbers. The transceiver 10 in FIG. 2 includes four lasers 1-4 (for clarity, only laser 1 is labeled as reference number 18), with each laser 18 having a different wavelength. The coupler chip 19 in FIG. 2 preferably provides wavelength-division multiplexing (WDM) using multiplexer (MUX) 26 and demultiplexer (DEMUX) 27. The coupler chip 19 in FIG. 2 does not show mode converters 20, but the mode converters 20 could be located on the coupler chip 19 either before or after the MUX 26 and DEMUX 27 along the various channels. The MUX 26 and/or the DEMUX 27 are preferably formed on glass with a low coefficient of thermal expansion and whose refractive index does not change greatly with temperature.

The MUX 26 combines the optical signals of the transmission channels so that the optical signals of all of the transmission channels are transmitted down the same Tx waveguide interconnect 21. The DEMUX 27 separates the optical signals received from a single Rx waveguide interconnect 22 for all of the reception channels. This combining and separating of optical signals is possible because the channels correspond to different wavelengths of light. Although in FIG. 2, the ratio of combining is 4:1 and the ratio of separating is 1:4, other ratios are possible. For example, if the transceiver 10 has 12 transmission channels and 12 reception channels, then the ratio of combining could be 12:3 or 12:1 and the ratio of separating could be 3:12 or 1:12. A ratio of 12:3 or 3:12 requires three waveguide interconnects instead of one.

In FIG. 2, the channels preferably operate in the O-band with a 20 nm wavelength spacing between channels; however, different bands and different wavelength spacings are both possible.

Figure 3:
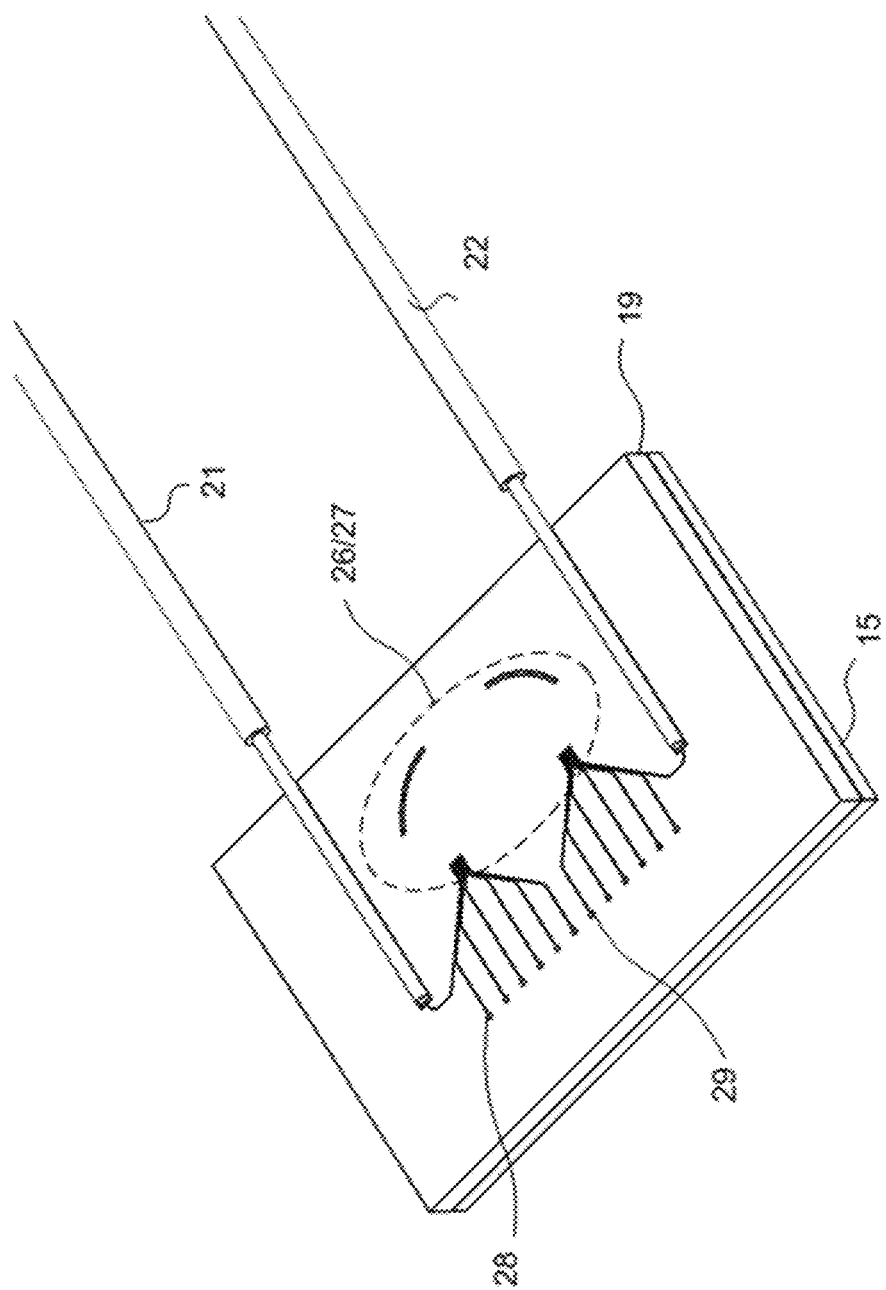
FIGS. 3 and 4 show coupler chips with Echelle gratings that can be used with the Silicon Photonics system shown in FIG. 2.
Figure 4:
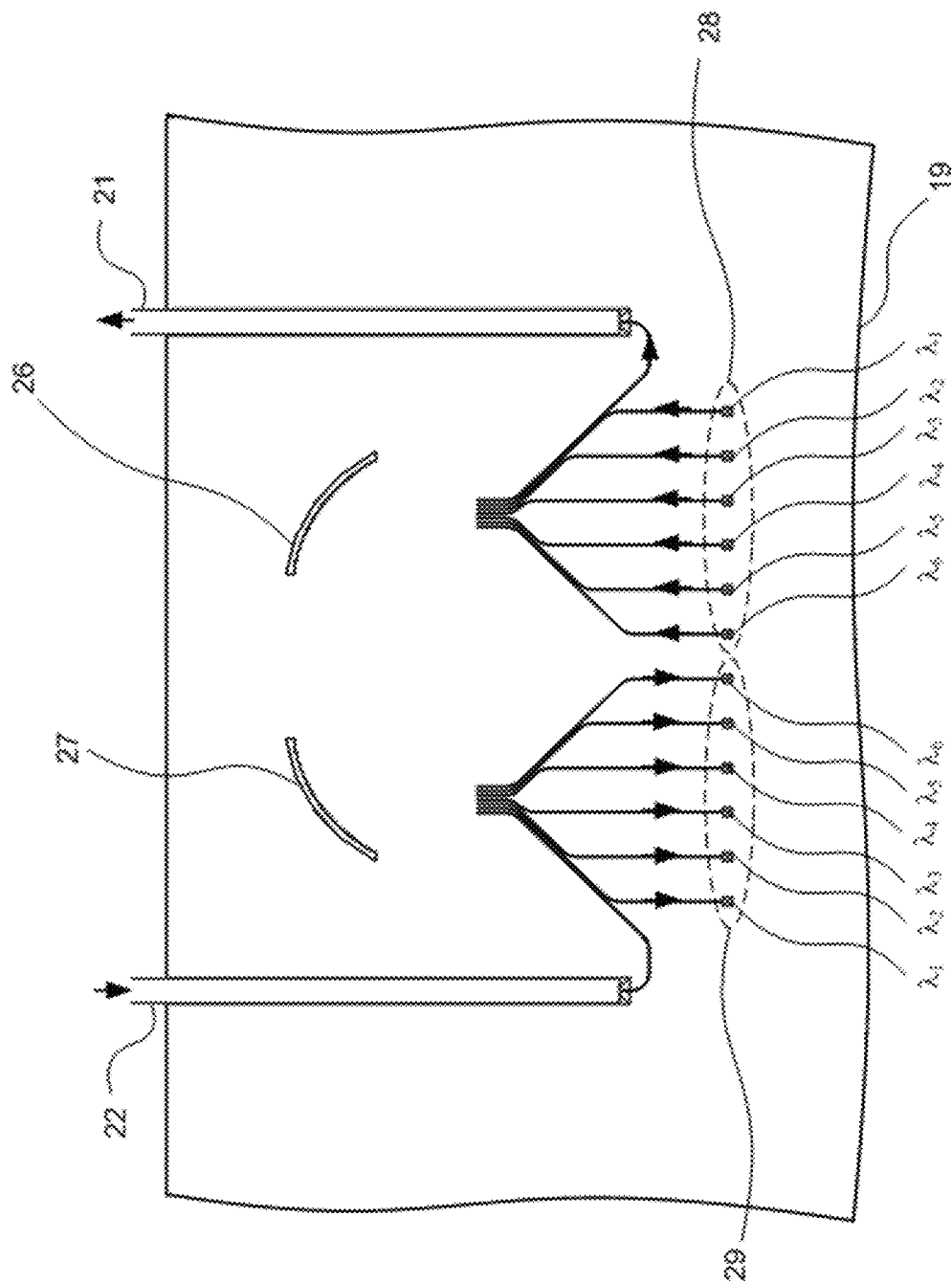

FIGS. 3 and 4 show coupler chips 19 that can be used with the Silicon Photonics system shown in FIG. 2. As shown in FIG. 3, the coupler chip 19 can be mounted to the top of the SiPho chip 15. The typical dimensions of the coupler chip 19 and SiPho chip 15 are about 0.5 mm to about 1 mm thickness, about 5 mm width, and about 5 mm length. Other sizes are also possible.

The coupler chips 19 in FIGS. 3 and 4 include a MUX 26 and a DEMUX 27. A single Tx waveguide interconnect 21 and a single Rx waveguide interconnect 22 are connected to the coupler chips 19. It is possible that the coupler chips 19 include more than one waveguide interconnects 21, 22 and more than one corresponding MUXs 26 and DEMUXs 27. In FIGS. 3 and 4, the coupler chips 19 includes six Tx turning structures 28 that turn the vertical light received from the SiPho chip 15 and six Rx turning structures 29 that turn the horizontal light received from the DEMUX 27. Each of the six turning structures 28, 29 is used for a corresponding wavelength $\lambda_1$-$\lambda_6$. The coupler chip 19 in FIG. 3 includes six transmission channels and six reception channels, but any number of transmission and reception channels could be used. The Tx turning structures 28 are connected to the MUX 26 so that the optical signals are combined and transmitted through the Tx waveguide interconnect 21. The Rx waveguide interconnect 22 is connected to the DEMUX 27 so that the optical signals are separated and transmitted through the Rx turning structures 29. In FIG. 3, the MUX 26 and the DEMUX 27 are shown as part of an Echelle grating. An Echelle grating can be preferably used because it can be compact and it often has less temperature sensitivity than other MUX/DEMUX elements.

If the coupler chip 19 is to be used in a transmitter instead of transceiver 10, then only MUX 26 and Tx waveguide interconnect 21 are needed. If the coupler chip 19 is to be used in a receiver instead of transceiver 10, then only DEMUX 27 and Rx waveguide interconnect 22 are needed.

Figure 5:
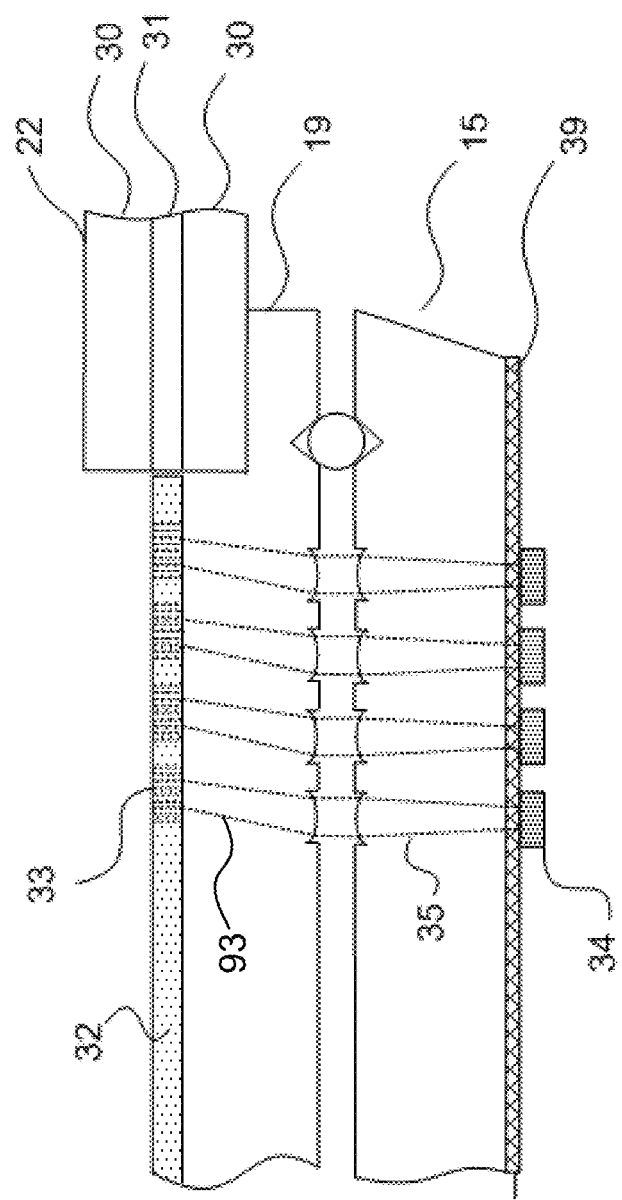
FIG. 5 shows a coupler chip with arrayed waveguide gratings that can be used with the Silicon Photonics system shown in FIG. 2.

FIG. 5 shows a wavelength selective grating that is used as DEMUX 27. The wavelength selective grating in FIG. 5 provides four channels, but any other number of channels could be used. The wavelength selective grating includes four channel gratings in the channel waveguide 32 of the coupler chip 19. For clarity, only one of the channel gratings is labeled 33. One channel in the wavelength selective grating includes the Rx waveguide interconnect 22, the channel grating 33, and the channel detector 34. The channel beam 35, which includes the optical signals, is transported through the Rx waveguide interconnect 22, the channel grating 33, and the channel detector 34. The light path of the channel beam 35 includes a guided section in the channel waveguide 32 of the coupler chip 19 and an unguided section 93 in the coupler chip 19 in which the channel beam 35 is not within the channel waveguide 32 nor any other waveguide structure. The channel beam 35 is preferably perpendicular to the surfaces of the coupler chip 19 and the SiPho chip 15 in the gap between the coupler chip 19 and the SiPho chip 15. FIG. 5 shows an arrangement used for DEMUX 27. A similar arrangement can also be used as MUX 26.

Figure 6:
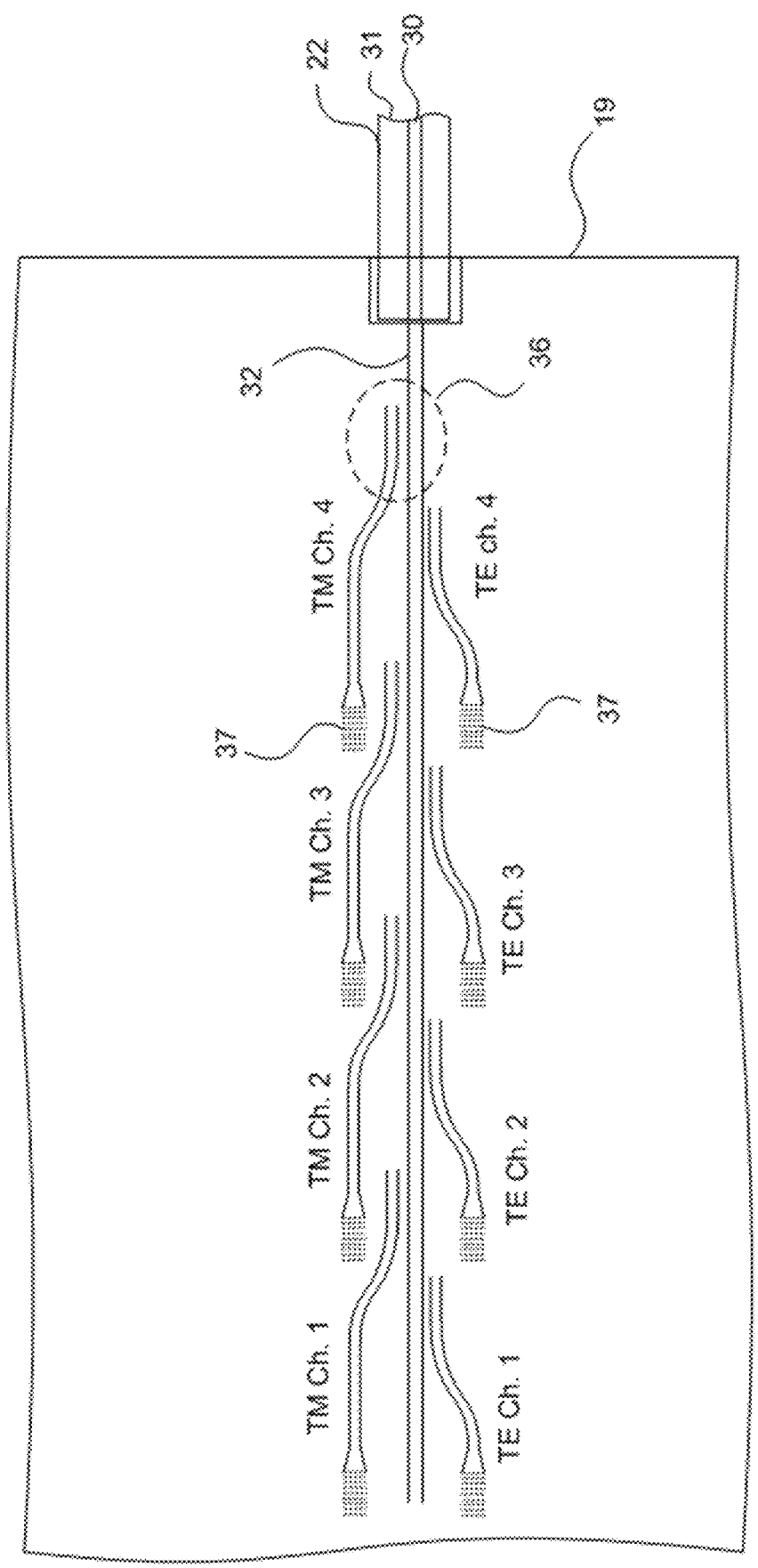
FIG. 6 shows a coupler chip with dichroic filters with surface gratings and directional couplers that can be used with the Silicon Photonics system shown in FIG. 2.

FIG. 6 shows dichroic filters with directional couplers 36 and grating couplers 37 that can be used as DEMUX 27. Directional couplers 36 and grating couplers 37 are wavelength sensitive, which can decrease channel crosstalk. Directional coupler 36 is preferably a lossless device that can split optical power into two optical channels. The grating couplers 37 can be replaced by micro-machined mirrors. Both directional coupler 36 and grating couplers 37 are generally polarization sensitive. Each channel includes a separate directional coupler 36 and a grating coupler 37 for the transverse electrical (TE) polarization and for the transverse magnetic (TM) polarization. Both polarizations can be spatially combined at a photodetector (not shown in FIG. 6) so that a single photodetector for each channel can be used. Alternatively, the polarizations could be angularly combined or a polarization beam combining structure could be used. FIG. 6 shows an arrangement used for DEMUX 27. A similar arrangement can also be used as MUX 26, but different polarizations do not have to be considered since the polarization of the laser source is generally well defined.

Instead of the Echelle grating, the wavelength selective grating, and the dichroic filters shown in FIGS. 3-6, it is also possible to use an arrayed waveguide grating other dichroic filter, or resonant interference filter as the MUX 26 and/or DEMUX 27.

Figure 7:
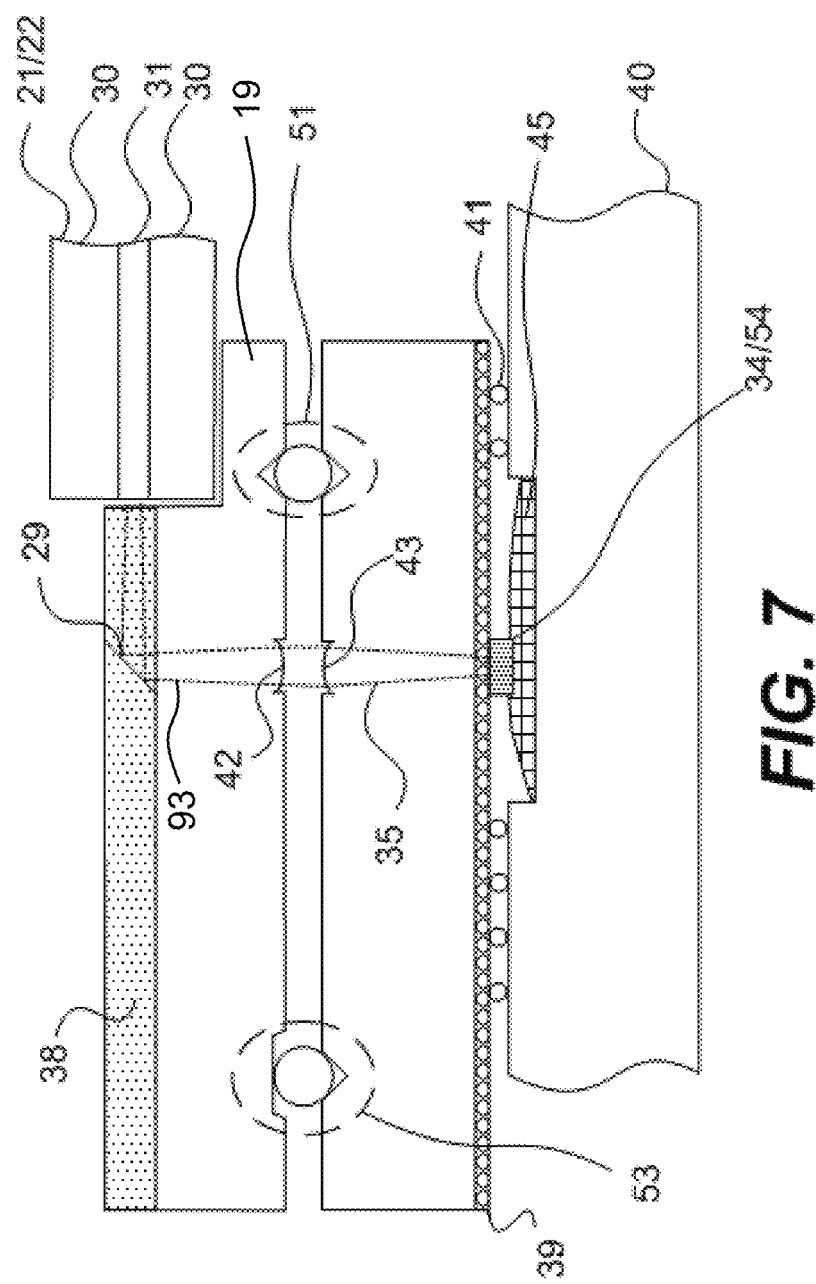
FIG. 7 shows a coupler chip connected to a SiPho chip.

FIG. 7 shows coupler chip 19 connected to SiPho chip 15. The reception channel includes the Rx waveguide interconnect 22 and the channel detector 34. For a transmission channel, Tx waveguide interconnect 21 is used instead of the Rx waveguide interconnect 22, and a channel laser 54 is used instead of the channel detector 34. The reception channel provides a light path between the Rx waveguide interconnect 22 and the channel detector 34, and the transmission channel provides a light path between the Tx waveguide interconnect 21 and the channel laser 54. The coupler chip 19 and the SiPho chip 15 can include various structures for manipulating the channel beam 35. The coupler chip 19 can include lens 42, and the SiPho chip 15 can include lens 43. The coupler chip 19 includes a Photonic layer 38 that includes passive waveguides, including Rx turning structure 29. The Rx turning structure 29 can include a micro-machined surface or a surface grating. The micro-machined surface can use total internal reflection or can include a reflective coating. The micro-machined surface can be flat or can be curved for focusing the channel beam 35 as shown in FIGS. 8-10, 32, and 33. The light path of the channel beam 35 includes a guided section in the Photonic layer 38 of the coupler chip 19 and an unguided section 93 in the coupler chip 19 in which the channel beam 35 is not within the Photonic layer 38 nor any other waveguide structure. Instead of turning structures 29, the end surface of the waveguide interconnects 21, 21 can be angled. The SiPho chip 15 includes a Photonic layer 39 that can include active waveguides, which are not shown in FIG. 7, but include modulators 16, for the transmission channel. For reception channels, the Photonic layer 39 of the SiPho chip 15 does not need to have active waveguides. In FIG. 7, the Photonic layer 38 of the coupler chip 19 is located on the top surface, but the Photonic layer 38 could be located on the bottom surface of the coupler chip 19. Similarly, the Photonic layer 39 of the SiPho chip 15 is located on the bottom surface, but the Photonic layer 39 could be located on the top surface of the SiPho chip 15. The coupler chip 19 and the SiPho chip 15 can include a coating, e.g., a dielectric such as Silicon nitride or Silicon oxide, to reduce back reflection in both transmission and reception channels.

Figure 8:
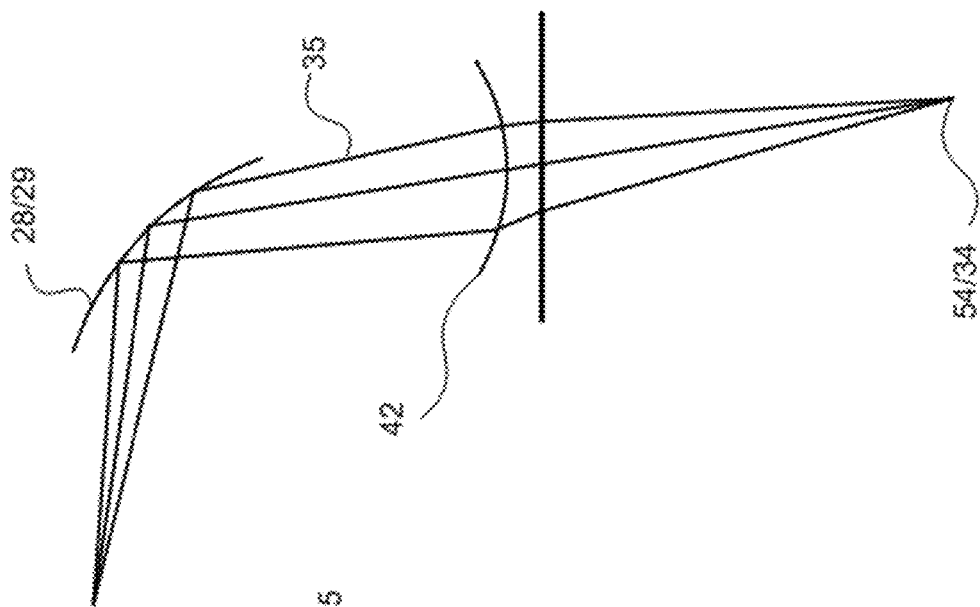
FIGS. 8-10, 32, and 33 show various possible optical arrangements for the coupler chip and SiPho chip.
Figure 9:
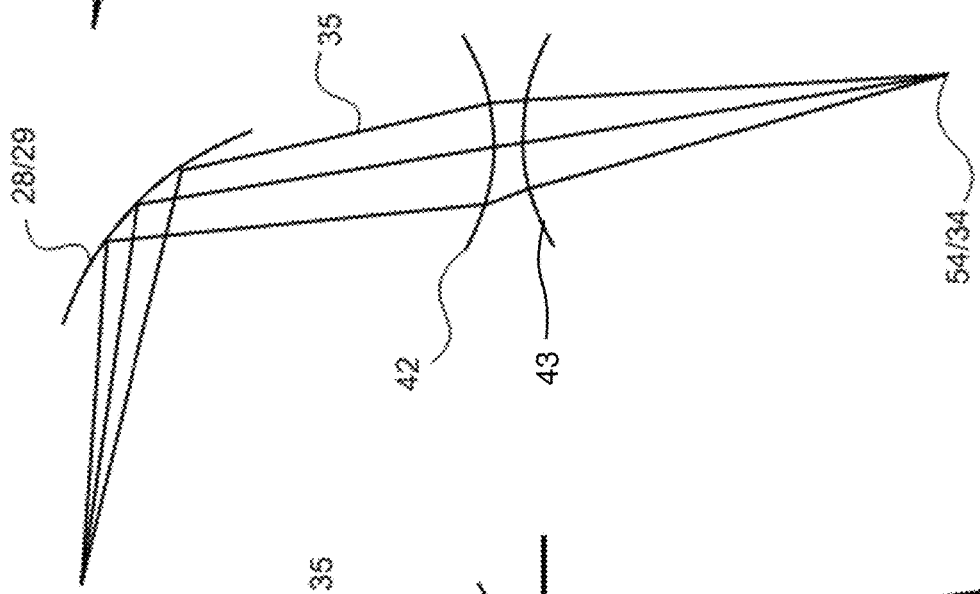
Figure 10:
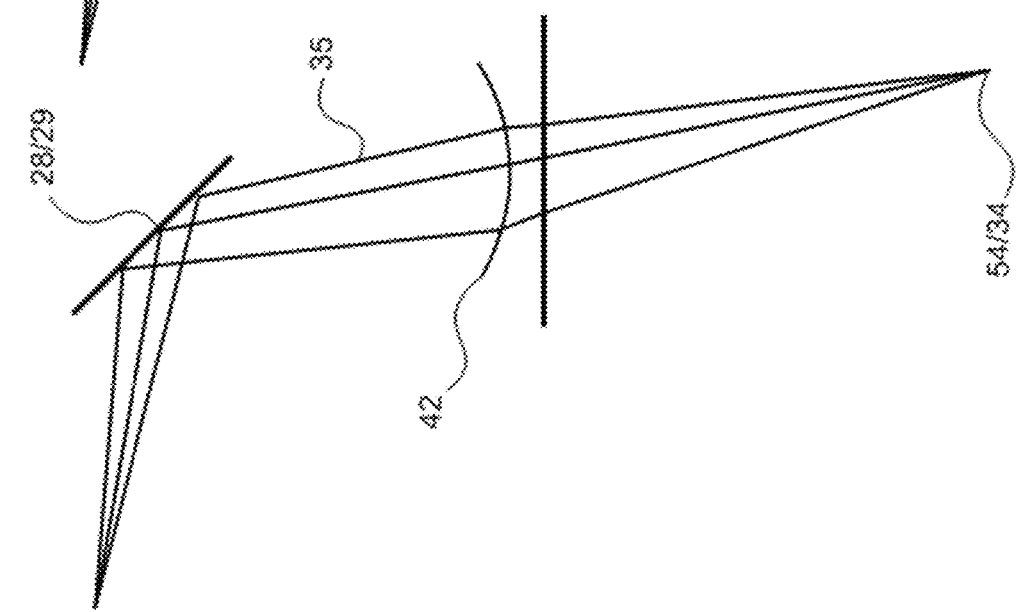
Figure 33:
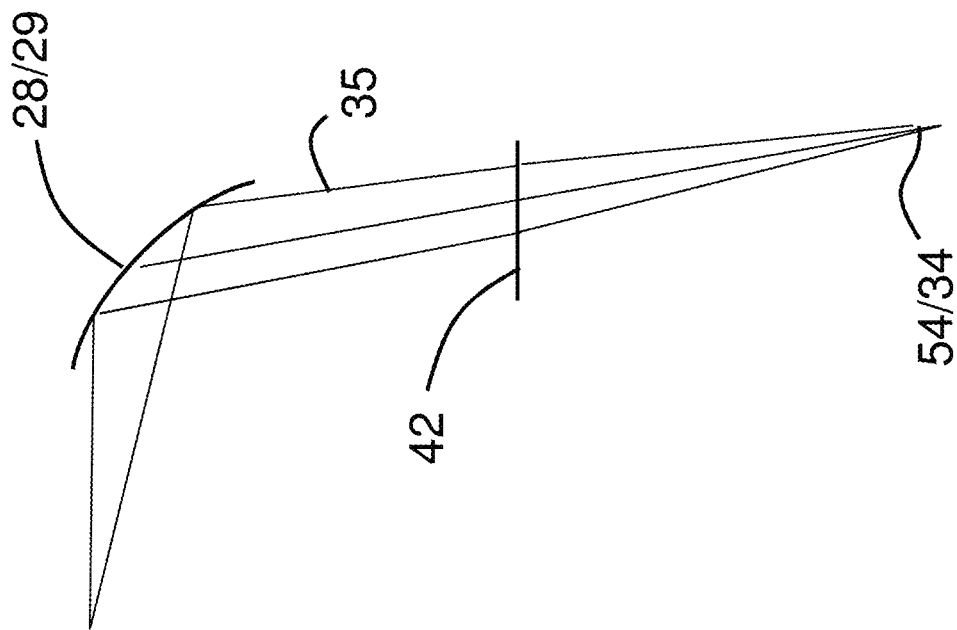
Figure 32:
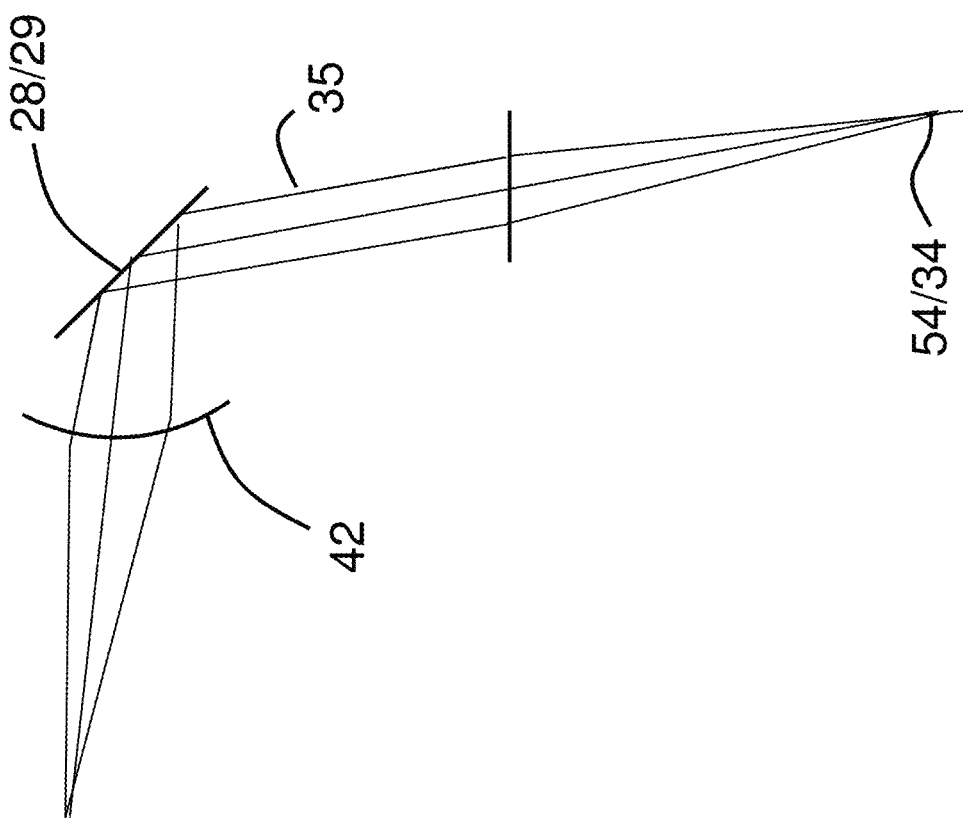

FIGS. 8-10, 32, and 33 show various possible optical arrangements for the coupler chip 19 and SiPho chip 15. FIG. 8 shows an arrangement with a single curved surface and includes flat Rx turning structure 29, flat SiPho chip 15 without lens 43, and lens 42 on coupler chip 19, which has the advantage of requiring only one curved surface. FIG. 9 shows an arrangement with three curved surfaces and includes curved Rx turning structure 29, lens 43 on SiPho chip 15, and lens 42 on coupler chip 19, which provides a collimated beam in the gap between SiPho chip 15 and coupler chip 19. FIG. 10 shows an arrangement with two curved surfaces and one flat surface and includes curved Rx turning structure 29, flat SiPho chip 15 without lens 43, and lens 42 on coupler chip 19, which provides the benefit of a flat surface on top of the SiPho chip 15 so that no or minimal processing is required on this surface of the SiPho chip 15. In FIGS. 32 and 33, the surfaces of the SiPho chip 15 and the coupler chip 19 facing each other are flat, and there is no space between the SiPho chip 15 and the coupler chip 19. FIG. 32 shows an arrangement with a single curved surface and includes a flat Rx turning structure 29, a flat SiPho chip 15 without lens 43, and a lens 42 on a coupler chip 19 but not facing the SiPho chip 15, which has the advantage of requiring only one curved surface. FIG. 33 shows an arrangement with a single curved surface and includes a curved Rx turning structure 29, a flat SiPho chip 15, and a flat coupler chip 19, which has the advantage of requiring only one curved surface.

The channel beam 35 can either be collimated (FIG. 9) or non-collimated (FIGS. 8, 10, 32, and 33). The channel beam 35 can be at an oblique angle, i.e. not perpendicular, as shown in FIGS. 8-10, 32, and 33. It is preferable that the channel beam 35 be collimated or nearly collimated in the gap region between the SiPho chip 15 and the coupler chip 19. A relatively large beam size in this region, i.e. about 20 μm to about 100 μm, relaxes the alignment tolerances between the SiPho chip 15 and the coupler chip 19. FIGS. 8, 10, 32, and 33, with a flat SiPho chip 15, avoid having to provide surface features on one side of SiPho chip 15. Depending on the optical layout, the required alignment between features on the top and bottom surfaces of the SiPho chip 15 can be, for example, ±1 μm. Obtaining this degree of precision can be difficult and costly. In an ideal system with collimated beams, positional misalignment between the SiPho chip 14 and the coupler chip 19 will result in no displacement at the focus. Although there might be a shift in angle, the waveguide interconnects 21, 22 and channel detector 34 are less angularly sensitive than positionally sensitive.

The various curved surfaces shown in FIGS. 8-10, 32, and 33 and lenses shown in FIG. 7 can be manufactured using laser machining in which an ultrafast laser (e.g., pico or femto second pulse widths) is moved over a surface to create the curved surface. Ablative material removal of laser machining leaves optically rough surfaces that do require post processing in some applications. Laser machining can take place underneath the surface of the coupler chip 19 and/or the spacer 56 (discussed below) to significantly reduce or minimize the amount of material that needs to be removed ablatively. Laser machining only removes material where the laser is focused, but laser machining can undercut large sections of material that can then be removed by another process. Laser machining provides great freedom in forming structures, including, e.g., lens and mirrors with different curvatures and orientations. It is possible to use a thermal polishing process to smooth out any remaining residual roughness from laser machining. It is also possible use an ultrafast laser to form waveguides in the coupler chip 19 by locally modifying the refractive index within the coupler chip.

Figure 27:
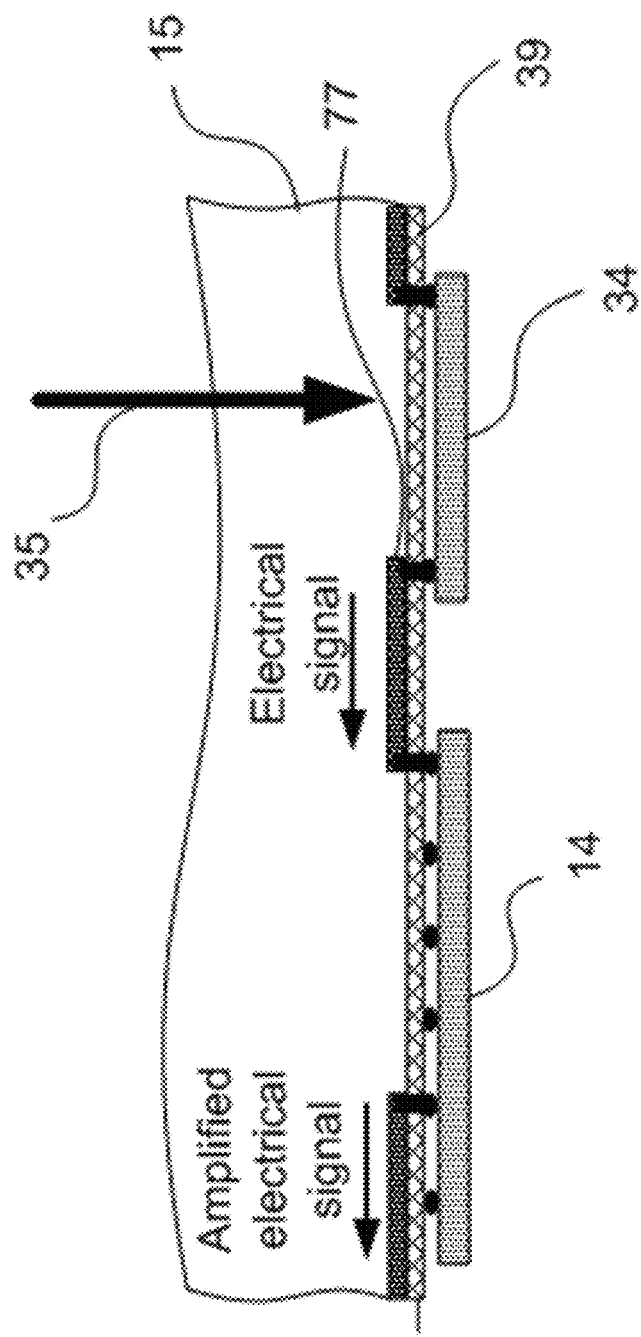
FIG. 27 shows an example of a SiPho chip.

The SiPho chip 15 includes one or more channel detectors 34 and/or one or more channel lasers 54. The channel detectors 34 either can be monolithically integrated into the SiPho chip 15 or can be surface mounted to the SiPho chip 15. Monolithically integrated channel detectors 34 can include Ge/Si devices with a responsivity of about 0.4 A/W (@1310 nm), and surface-mounted channel detectors 34 can include InGaAs devices with a responsivity of about 0.9 A/W (@1310 nm), which is about twice as responsive as the monolithically integrated channel detector. The channel detector 34 can be a resonant cavity enhanced detector that provides wavelength filtering or can be a ring resonator. FIG. 27 shows an example of SiPho chip 15 in which the channel detector 34 and the TIA 14 are surface mounted to the Photonic layer 39, preferably near one another. The diameter of the channel detector 34 can vary depending on the required bandwidth. Higher bandwidth systems have channel detectors 34 with smaller diameter. For example, a 10 Gbps system might have a detector diameter of about 70 μm, while a 28 Gbps system might have detector diameter of about 22 μm.

SiPho chip 15 is preferably connected to PCB 40 using flip-chip technology, including, for example, a ball grid array (BGA) 41. Other components, including, for example, laser driver 12, modulator driver 13, TIA 14, etc., can also use stud bump flip-chip technology. The PCB 40 preferably includes a recess 44 that includes a thermal compound 45 that is in contact with the channel detector 34 or the channel laser 54.

Figure 17:
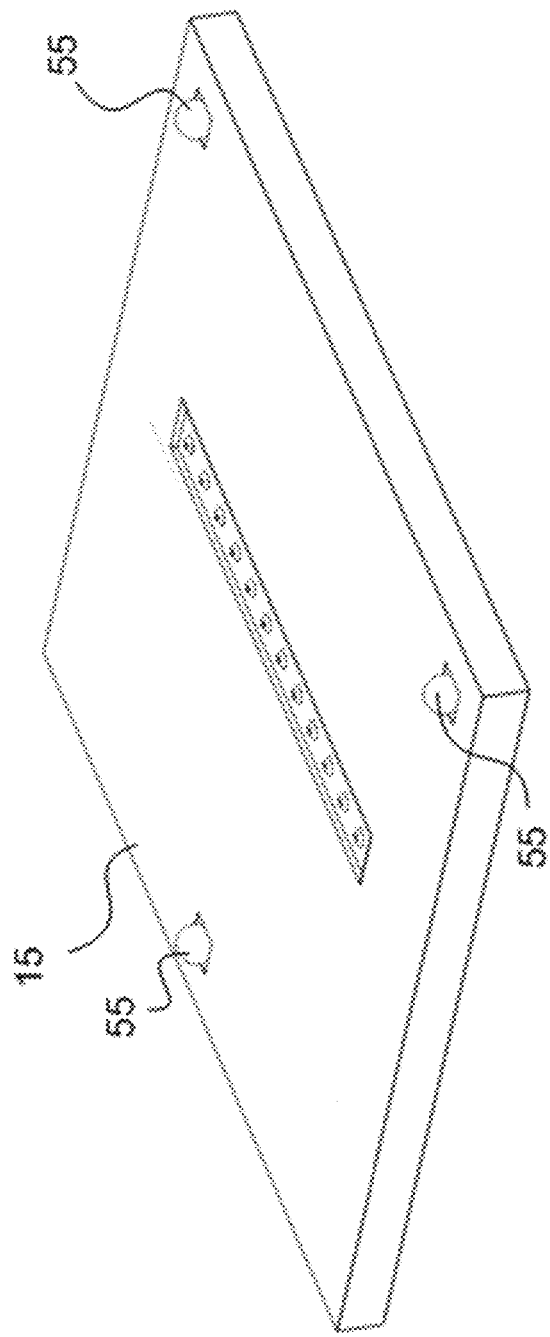

The coupler chip 19 and the SiPho chip 15 can be spaced apart with a gap so that heat generated by the SiPho chip 15 has a poor thermal path from the SiPho chip 15 to the coupler chip 19. The gap can be filled with UV cured adhesive if UV light can be transmitted through the coupler chip 19. The gap can be about 20 μm to about 50 μm, for example. With a gap between the coupler chip 19 and the SiPho chip 15, the coupler chip 19 and the SiPho chip 15 are aligned with each other to ensure proper operation of all channels. The alignment features can have different degrees of freedom. For example, fixed alignment spheres 55 on the SiPho chip 15 can be engaged with a point contact 51, a line contact 52, and a plane contact 53 in the coupler chip 19 as shown in FIGS. 17 and 18. This arrangement can be reversed such that the alignment spheres 55 are located on coupler chip 19 and the contacts 51, 52, 53 are located SiPho chip 15. The contacts 51, 52, 53 can be micro-machined, can be formed by photolithography and anisotropic etching, or can be formed by a laser machining process. The alignment spheres 55 can be fixed into depressions. Alternatively, the alignment spheres 55 can be replaced with alignment protrusions that are formed on the surface of the SiPho chip 15 (or the coupler chip 19). The alignment spheres can be made of glass.

In FIG. 17, in the SiPho chip 15 includes anisotropically etched inverted pyramids in which the alignment spheres 55 are fixed. In FIG. 18, the coupler chip 19 includes matching recesses that define the contacts 51, 52, 53. The alignment spheres 55 provide a rigid connection, while the contacts 51, 52, 53 are arranged to prevent bending and twisting caused by differences in the coefficient of thermal expansion of the SiPho chip 15 and the coupler chip 19. It is desirable to avoid or minimize bending and twisting because bending and twisting can result in a reduction in coupling efficiency and the inoperability of the transceiver 10. Avoiding or minimizing thermally induced bending and twisting increases the operating temperature range of the transceiver 10.

The SiPho chip 15 and the coupler chip 19 can be held together by a compliant adhesive that contracts during curing. The compliant adhesive can be supplied by injecting the compliant adhesive in the through holes 59 on the coupler chip 19. The compliant adhesive can be UV cured, although this is not a requirement.

Figure 13:
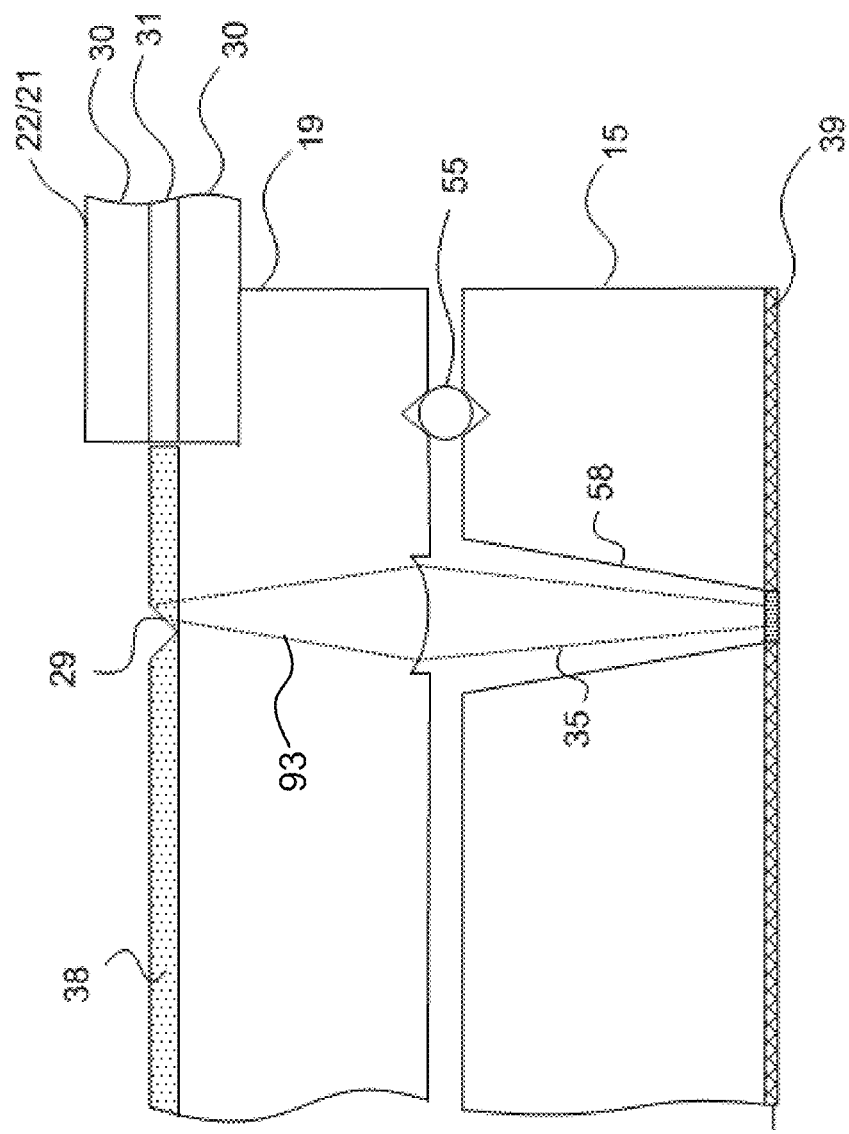
FIG. 13 shows a SiPho chip with a via.

In addition to the lens arrangements shown in FIGS. 8-10, 32, and 33, various other techniques can be used as shown in FIGS. 11-15 to modify the size of the channel beam 35. As shown in FIGS. 11-13, the light path of the channel beam 35 can include a guided section in the Photonic layer 38 of the coupler chip 19 and an unguided section 93 in the coupler chip 19 in which the channel beam 35 is not within the Photonic layer 38 nor any other waveguide structure. These techniques and the lens arrangements can be used separately and in combination.

FIGS. 11 and 12 show a hybrid SiPho chip 57 that includes a spacer 56 attached to the SiPho chip 15. The spacer 56 can be about 0.5 mm to several mm thick. The spacer 56 allows for more beam expansion between the hybrid SiPho chip 57 and the coupler chip 19, which relaxes alignment tolerances and allows for passive alignment. The spacer 56 can include fiducial marks or micro-machined structures that help with alignment of the coupler chip 19 and the hybrid SiPho chip 15.

The spacer 56 can be made of glass or Silicon, the same material as the SiPho chip 15. The coefficients of thermal expansion of the spacer 56 and the SiPho chip 15 can be matched or substantially matched to avoid excessive stress build up. The spacer 56 can be anodically bonded to the SiPho chip 15. The spacer 56 can be bonded to a wafer of SiPho chips, e.g. an 8-inch or 12-inch wafer, and then singulated after bonding. Assuming 75% wafer utilization and a 5 mm×5 mm chip, then 972 devices can be obtained from an 8-inch wafer and 2188 devices can be obtained from a 12-inch wafer. The coupler chip 19 can be attached either at the wafer level or can be attached after singulation.

FIG. 11 shows a gap between the hybrid SiPho chip 57 and the coupler chip 19, while FIG. 12 shows that the hybrid SiPho chip 57 and the coupler chip 19 are anodically bonded together, which can be performed at the wafer level and which can reduce part counts.

FIG. 13 shows the SiPho chip 19 with via 58. The via 58 can have tapered walls as shown in FIG. 13 or can have straight walls (not shown). The via 58 can be oversized to relax alignment tolerances as long as the channel detector 34 is fully exposed. An oversized via 58 does not require high positional tolerances for backside SiPho processing. The via 58 can be metallized to provide a reflective surface, which can eliminate the need for any lens in the channel or which can relax alignment tolerances. As shown in FIG. 13, the via 58 can terminate at the photonic layer 39 if an integrated channel detector 34 is used. Alternatively, the via 58 can extend through the photonic layer 39.

Figure 14:
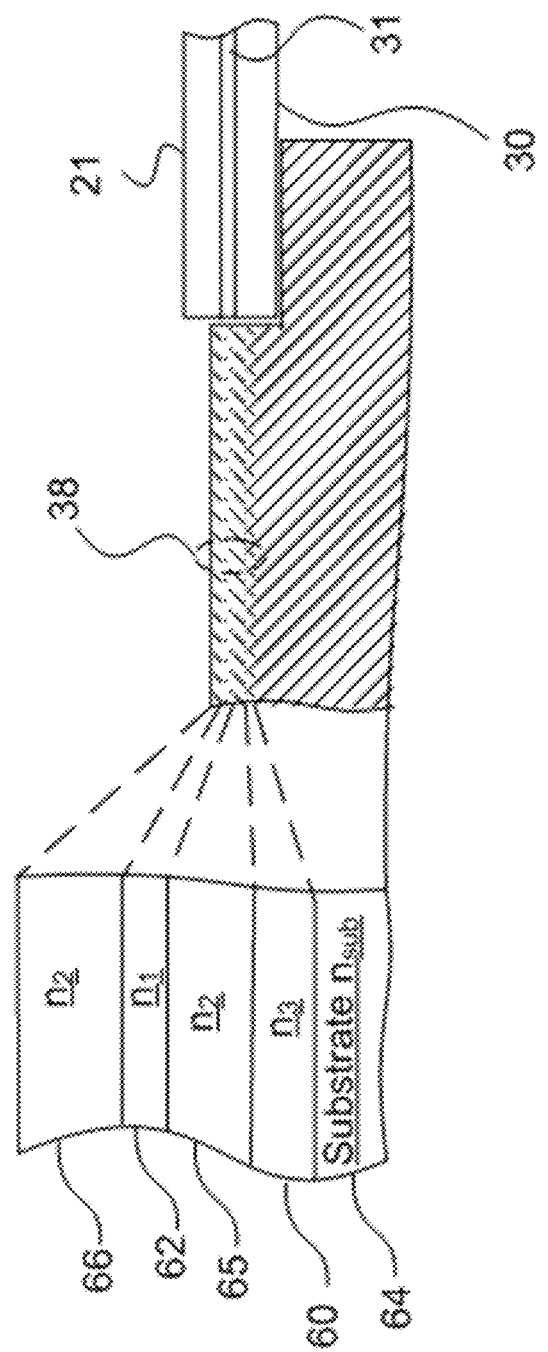
FIGS. 14 and 15 show a coupler chip with two waveguide layers.
Figure 15:
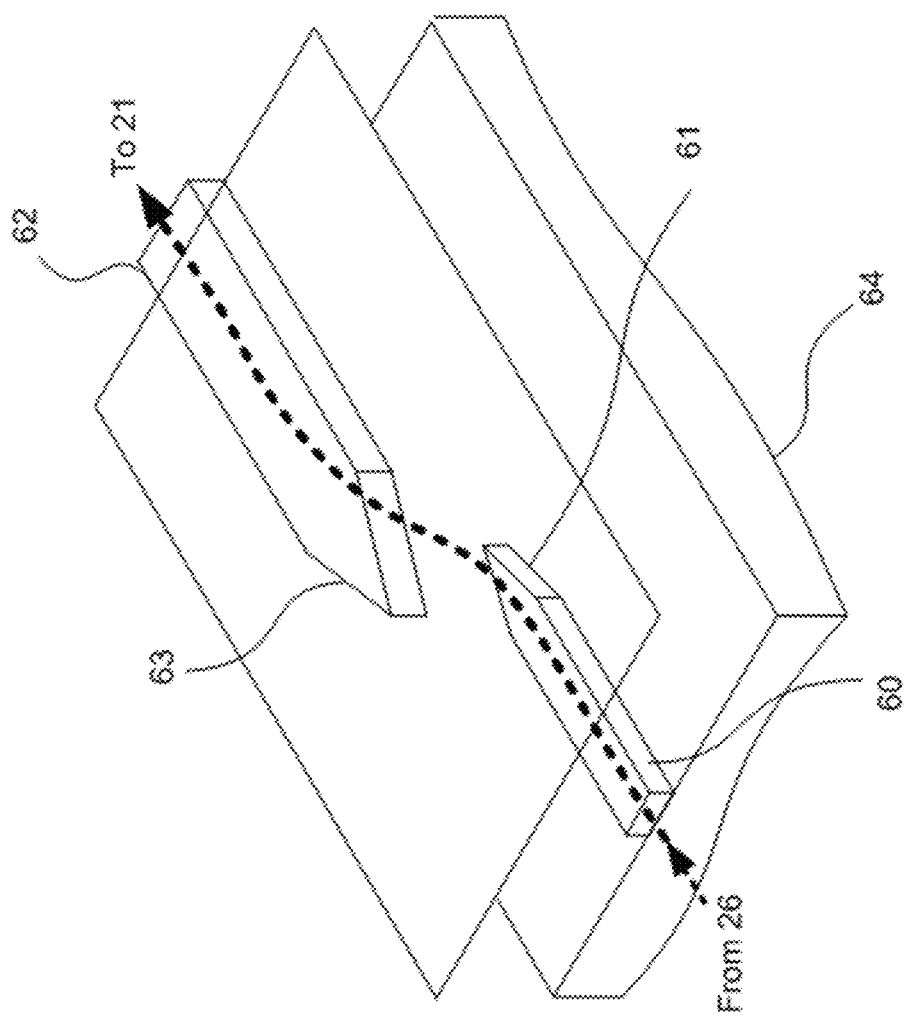

FIGS. 14 and 15 show a coupler chip 19 with a first waveguide 60 and a second waveguide 62 in the photonic layer 38. The first waveguide 60 is located on substrate 64, which is preferably glass, and includes first taper 61. The second waveguide 62 is located above the first waveguide 60 and includes second taper 63. The first and second waveguides 60 and 62 are arranged such that optical energy is coupled by evanescent fields through first and second tapers 61, 63.

Preferably, the first and second waveguides 60 and 62 have different optical and physical properties. For example, the first and second waveguides 60 and 62 can have different sizes supporting different mode sizes. Larger mode sizes can help in coupling the light from a channel laser 54 to the waveguide interconnect 21, while smaller mode sizes can help in MUX/DEMUX operation and modulation.

The photonic layer 38 preferably includes as least one of PMMA (Polymethyl methacrylate), SU8 photoresist, Silicon, Silicon dioxide, and Silicon nitride. The first and second waveguides 60 and 62 can be made of different materials from each other. The first waveguide 60 can be made of SiN because SiN waveguides generally are smaller, and the second waveguide 62 can be made of $SiO_2$ because $SiO_2$ waveguides can have dimensions that match well to mode size of single mode fiber. This allows the first waveguide 60 to be connected to MUX 26 and the second waveguide 62 to be connected to the Tx waveguide interconnect 21.

The first and second waveguides 60 and 62 can be made by different processes, including photolithography using a combination of doping, etching, or material deposition and laser machining, either by material removal or by modification of material properties to change the material's refractive index and/or density. Laser machining can densify and/or increase the refractive index by focusing short pulse-length laser light into a material. The focused spot can locally change refractive index in a small volume, e.g., on the order of 10-100 $\mu m^3$. The focused spot can be scanned along a material at high rates, e.g., 100 mm/sec.

As shown in FIG. 14, the photonic layer 38 includes, from top to bottom:
1) a top layer 66 with an index of refraction $n_2$;
2) second waveguide 62 with an index of refraction $n_1$;
3) a middle layer 65 with the index of refraction $n_2$; and
4) first waveguide 60 with an index of refraction $n_3$ The Photonic layer 38 is on top of substrate 64 with an index of refraction of $n_{sub}$. The first and second waveguides 60 and 62 have different optical properties such that $n_1 \neq n_3$. The index of refraction $n_1$ of the second waveguide 62 is larger than the index of refraction $n_2$ of the top and middle layers 66 and 65, i.e., $n_1 > n_2$. The index of refraction $n_3$ of the first waveguide 60 is larger than the index of refraction $n_2$ of the middle layers 65 and index of refraction $n_{sub}$ of the substrate 64, i.e., $n_3 > n_2$ and $n_3 > n_{sub}$. Other arrangements are also possible, as long as the refractive index of the waveguide is higher than the refractive index of the material immediately surrounding the waveguide.

Although FIGS. 14 and 15 show a coupler chip 19, similar structures can also be formed in the photonic layer 39 of the SiPho chip 15.

Figure 30:
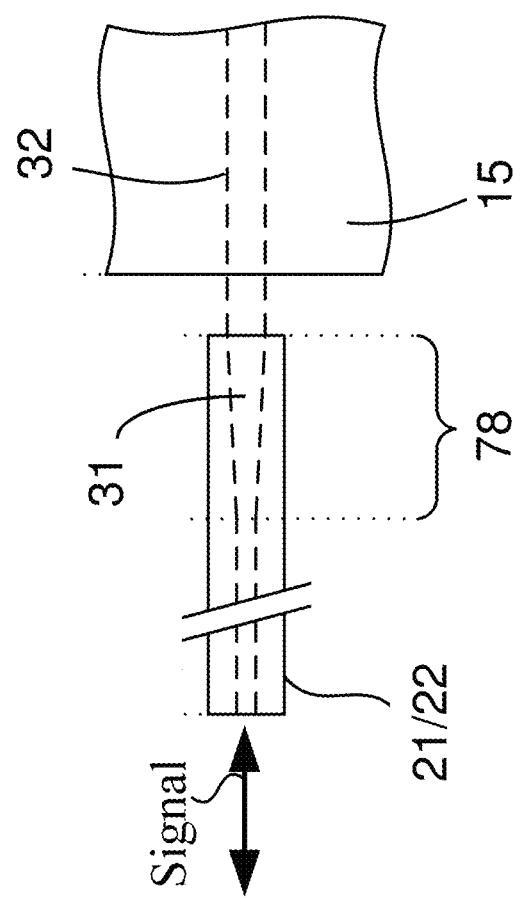
FIG. 30 shows an optical fiber with a spot-size-converter region.

In addition to the arrangements and techniques shown in FIGS. 8-15, 32, and 33, it is also possible to use waveguide interconnects 21, 22 that include a spot-size-converter region 78 as shown in FIG. 30. The mode size of the channel waveguide 32 in the coupler chip 15 can match or substantially match, within manufacturing tolerances, the mode size at end of spot-size-converter region 78 of the waveguide interconnects 21, 22. Waveguide interconnects 21, 22 with spot-size-converter regions 78 can be used instead of or in addition to the arrangements and techniques shown in FIGS. 8-15, 32, and 33.

The spot-size-converter region 78 can be provided by an adiabatic taper at the end of the waveguide interconnect 21, 22. Increasing the mode size reduces the alignment tolerances between the channel waveguide 32 in the coupler chip 15 and the core 31 of the waveguide interconnect 21, 22. If the waveguide interconnect 21, 22 is an optical fiber, then the spot-size-converter region 78 can be created by locally heating the waveguide interconnect 21, 22, causing diffusion of dopants forming the core 31. Ultrashort-laser processing can be used for locally heating the optical fiber. The ultrashort-laser processing changes the optical fiber's refractive index by focusing the laser in a 3-dimensional pattern in the optical fiber, thus creating the spot-size-converter region 78. Mode size of a single-mode optical fiber can be increased from about 9 μm to about 20 microns. Standard single-mode optical fiber has approximately a 1 dB optical loss from a 1-μm misalignment between the core 31 and the channel waveguide 32. Doubling the mode size can increase the 1 dB alignment tolerance to more than 2 μm.

Figure 16:
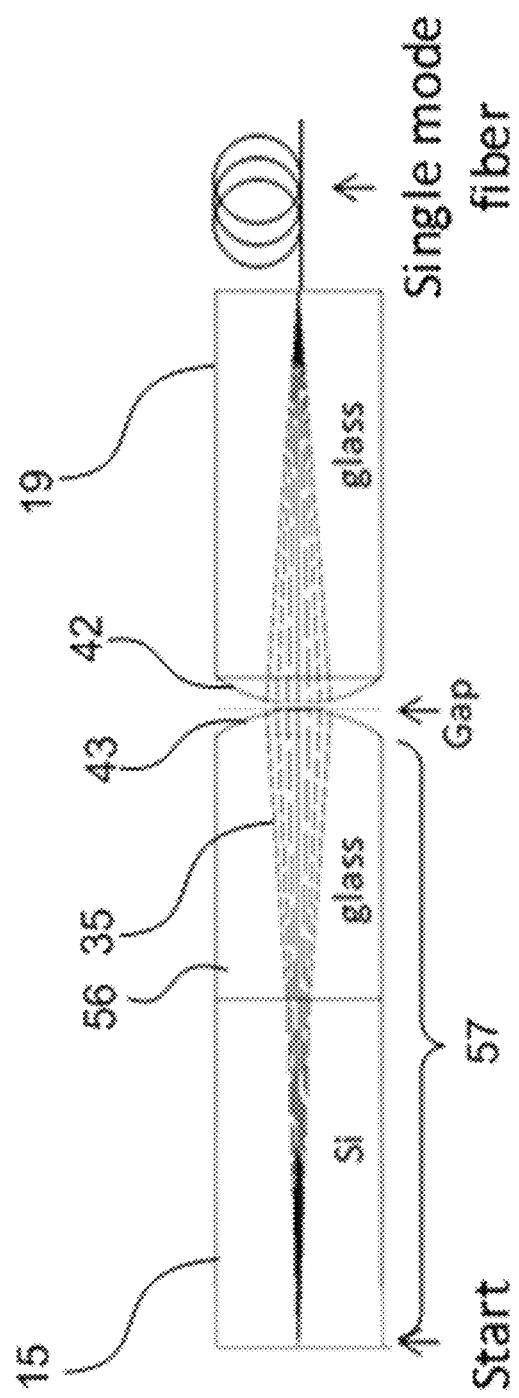
FIG. 16 shows an example of a transmission-side beam model for the hybrid SiPho chip and the coupler chip.

FIG. 16 shows an example of a transmission-side beam model for the hybrid SiPho chip 57 and the coupler chip 19. FIG. 16 does not include or show any turning structures in the light path and does not include or show any of the techniques shown in FIGS. 11-15. FIG. 16 does include two curved surfaces as shown in FIG. 9. At Start, the channel beam 35 is assumed to be a 0.5-μm-size Gaussian beam. The hybrid SiPho chip 57 includes a 0.7-mm-thick Silicon chip with a refractive index of n=3.5 as the SiPho chip 15 and includes a 0.5-mm-thick borosilicate glass layer with a refractive index of n=1.45 as the spacer 56. The borosilicate glass layer can be Borofloat®, which is made by a microfloat process that results in a glass with a low coefficient of thermal expansion and with good surface quality, visible-light transmission characteristics, and mechanical strength. The lens 43 in the spacer 56 has a 351-μm radius of curvature. There is a 15-μm gap between the hybrid SiPho chip 57 and the coupler chip 19. The lens 42 of the coupler chip 19 has a 343-μm radius of curvature. The coupler chip 19 includes a 0.7-mm thick Borofloat® glass layer with a refractive index of n=1.45. In this example, the channel beam 35 is collimated with 66-μm beam size in the gap and has 85% coupling efficiency into a standard single-mode optical fiber. A borosilicate glass, including some Borofloat® glasses, can be used for the coupler chip 19 that has a coefficient of thermal expansion of 3.25 ppm, which is about 25% different from the coefficient of thermal expansion of Silicon of 2.6 ppm.

FIGS. 19 and 20 show a vision-assisted alignment arrangement that can be used instead of or in addition to the kinematic alignment arrangement shown in FIGS. 17 and 18. In the vision-assisted arrangement, the coupler chip 19 includes a fiducial 100, and the SiPho chip 15 includes a fiducial 101. The fiducials 100, 101 can be aligned as shown in FIG. 20. As shown in FIG. 19, to align the SiPho chip 15 and the coupler chip 19, the SiPho chip 15 is placed on platform 104, and the chuck 105 is used to move the coupler chip 19 with respect to the SiPho chip 15. Chuck 105 can be moved in x-, y-, and z-directions and can possibly be rotated. Platform 104 can be moved in the x- and y-directions and can possibly be rotated. The top camera 103 is used to view the fiducial 100 on the coupler chip 19, and the bottom camera 102 is used to view the fiducial 101 on the SiPho chip 15. The coupler chip 19 and the SiPho chip 15 are aligned with each until the cameras 102, 103, which are precisely aligned in x- and y-directions, can be used to visually confirm that fiducials 100, 101 are aligned as shown in FIG. 20. Because two cameras 102, 103 are used and the cameras 102, 103 can see the fiducials 100, 101 on surfaces facing the cameras 102, 103, it is not necessary for the cameras 102, 103 to see through the SiPho chip 15 or coupler chip 19. However, it is also possible to use a wavelength of light that is transmitted through the coupler chip 19 and/or the SiPho chip 15, which allow the vision-assisted alignment system to align marks on the side of the coupler chip 19 and/or the SiPho chip 15 opposite the camera 102 or 103. It is possible that waveguides in the coupler chip 19 and/or the SiPho chip 15 can transport optical radiation visible to the vision-assisted alignment system to allow active alignment.

The coupler chip 19 and the SiPho chip 15 can have between zero and three alignment features using contacts 51, 52, 53. For zero alignment features (i.e., not using any of contacts 51, 52, 53), alignment of the coupler chip 19 and the SiPho chip 15 is done using only fiducials 100, 101. For three alignment features (i.e., using all of contacts 51, 52, 53), vision-assisted alignment may not be necessary, although it may be helpful. For one or two alignment features, some degrees of freedom between the coupler chip 19 and the SiPho chip 15 can be determined with the alignment features, and some degrees of freedom can determined by using vision-assisted alignment with fiducials 100, 101.

In FIGS. 17-20, the alignment features are used to align the coupler chip 19 and the SiPho chip 15. In addition, similar alignment features can be used to align the SiPho chip 15 and spacer 56.

Figure 31:
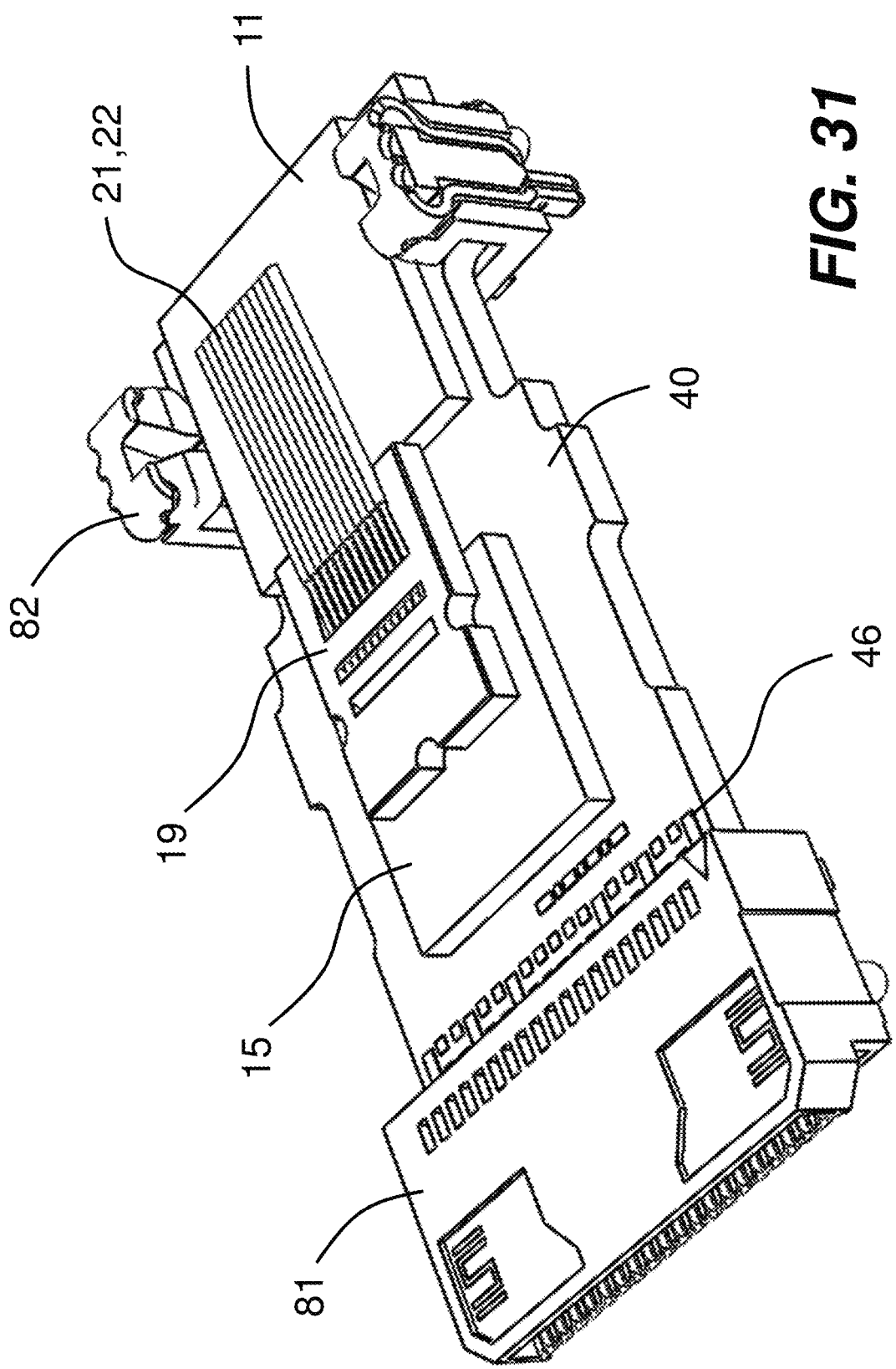
FIG. 31 shows a transceiver connected to two connectors.

FIGS. 21, 22, and 34 show examples of transceiver 10. The transceiver 10 shown in FIGS. 21 and 22 include a PCB 40. The microcontroller 11 and the SiPho chip 15 are mounted to the PCB 40. The coupler chip 19 and the SiPho chip 15 are enclosed in a housing 70. Heat sink 71 is optional and can be used to dissipate heat from the SiPho chip 15 or components mounted on the SiPho chip 15. As shown in FIG. 21, the heatsink 71 can be connected to the bottom of the SiPho chip 15. As shown in FIG. 34, in addition to heatsink 71 attached to the bottom of the SiPho chip 18, heatsink 79 can be connected to the top of the SiPho chip 15. The waveguide interconnects 21, 22 can be permanently attached to the transceiver 10. That is, waveguide interconnects 21, 22 can be pigtailed optical fibers. The PCB 40 includes lands 46 along one edge that can inserted into a connector (not shown in FIGS. 21 and 22). The connector can be located in an IC package, in the middle of a host PCB (not shown in FIGS. 21 and 22), or an interposer. FIG. 31 shows PCB 40 inserted into first connector 81. As shown in FIG. 31, it is also possible that PCB 40 can be connected to a second connector 82 simultaneously with the first connector 81, although this is not required. If the transceiver 10 is connected to the first and second connectors 81, 82 as shown in FIG. 1, then it is possible that high-speed signals are transported through the first connector 81 and low-speed signals are transported through the second connector 81. It is preferable that the waveguide interconnects 21, 22 are angled with respect to the transceiver 10 so that, when the transceiver 10 is plugged into a connector in the middle of a PCB, the waveguide interconnects 21, 22 extend over and do not interfere with any of the other devices on the PCB. Although multiple interconnects 21, 22 are shown in FIGS. 21 and 22, a single waveguide interconnect 21 or 22 could be used.

FIGS. 23 and 24 show an example of transceiver 10 with a latch 72. The transceiver 10 in FIGS. 21 and 22 and the transceiver 10 in FIGS. 23 and 24 are similar, except that the transceiver 10 in FIGS. 23 and 24 includes latch 72. Because the waveguide interconnects 21, 22 are detachable from the transceiver 10, the waveguide interconnects 21, 22 can be connecterized optical fibers. In the transceiver 10 in FIGS. 23 and 24, the SiPho chip 15 and the housing 70 with latch 72 are arranged such that, after the coupler chip 19 is inserted into the housing 70, the coupler chip 19 is secured within the housing 70 and aligned with the SiPho chip 15. The transceiver 10 can include coarse alignment features that generally align the coupler chip 19 and the SiPho chip 15. The alignment spheres 55 and contacts 51, 52, 53 can precisely align the coupler chip 19 and the SiPho chip 15. The coarse alignment features can be located in any suitable location, including on any of the coupler chip 19, the SiPho chip 15, housing 70, or heatsink. For example, coarse alignment features can include etched guideposts on the coupler chip 19 or the SiPho chip 15 that align with corresponding etched guide holes in the SiPho chip 15 or the coupler chip 19. A heatsink (not shown) can be integrated into the latch 72 or located on the housing 70 with a cutout that does not cover the latch 72.

Figure 25:
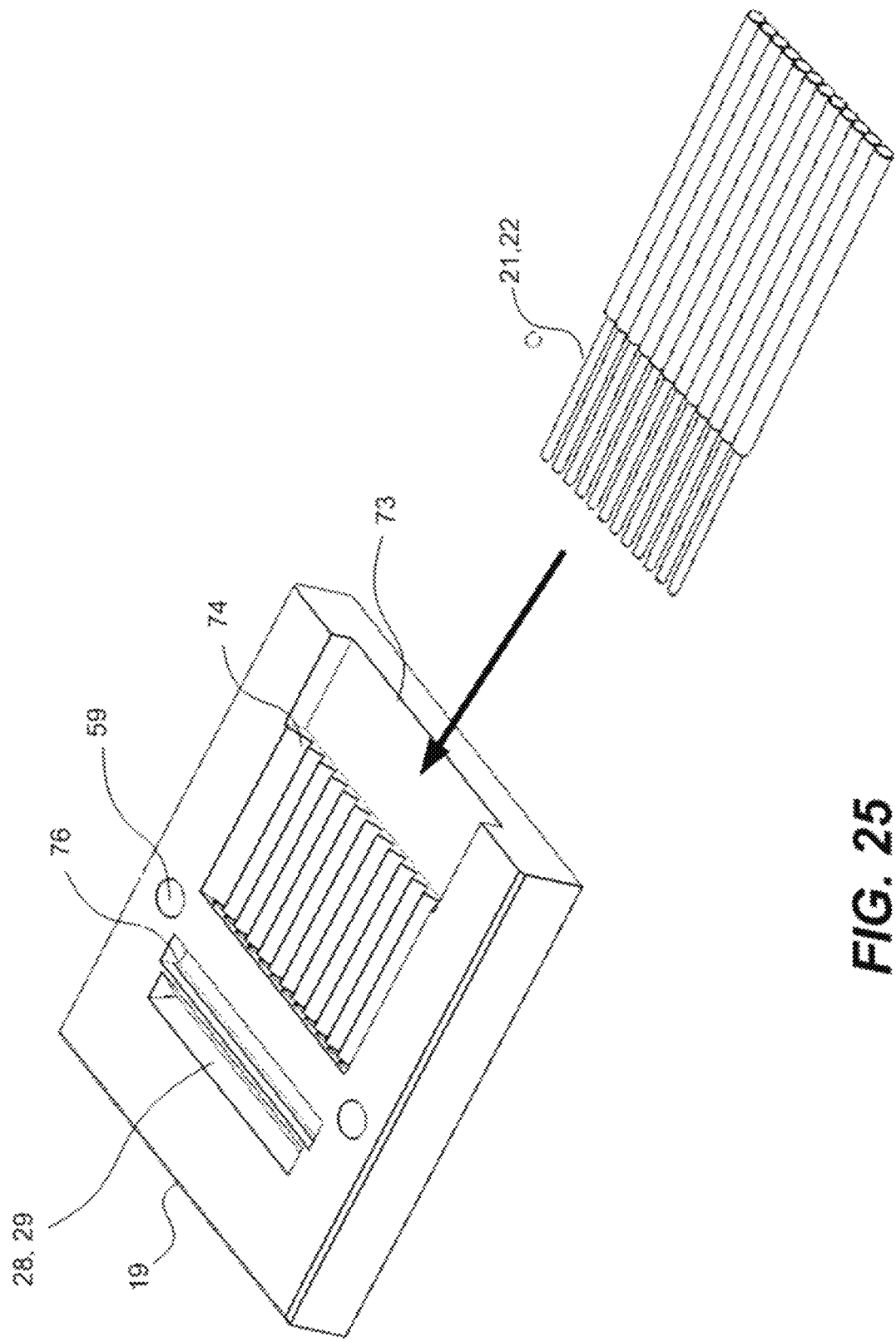
FIGS. 25 and 26 show an example of a coupler chip.
Figure 26:
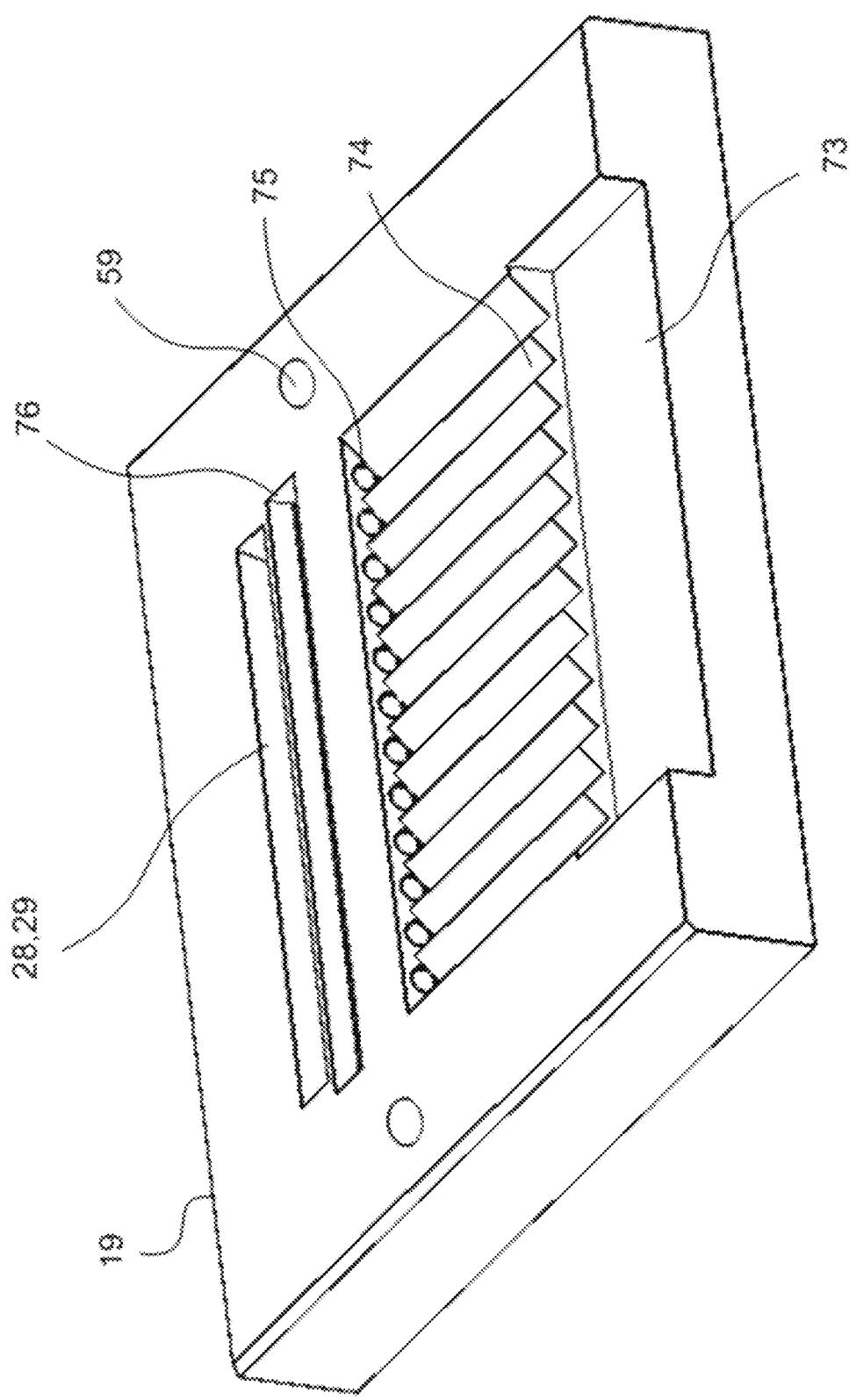

FIGS. 25 and 26 show an example of coupler chip 19. The coupler chip 19 includes an array of grooves 74 and a recess 73 for the waveguide interconnects 21, 22. Each of the waveguide interconnects 21, 22 can be inserted into a corresponding hole 75, which precisely aligns the waveguide interconnects 21, 22 within the coupler chip 19. Holes 75 can be fabricated with a laser using ultrashort laser pulses. The coupler chip 19 includes a trough 76 that can be filled with an adhesive to secure the waveguide interconnects 21, 22 permanently in position. Adhesive can also be applied in the recess 73 to provide strain relief. In FIGS. 25 and 26, the turning structures 28, 29 provide a total internal reflecting surface on the side of adjacent waveguide interconnects 21, 22 so that light from the waveguide interconnects 21, 22 can be directed downward.

Figure 28:
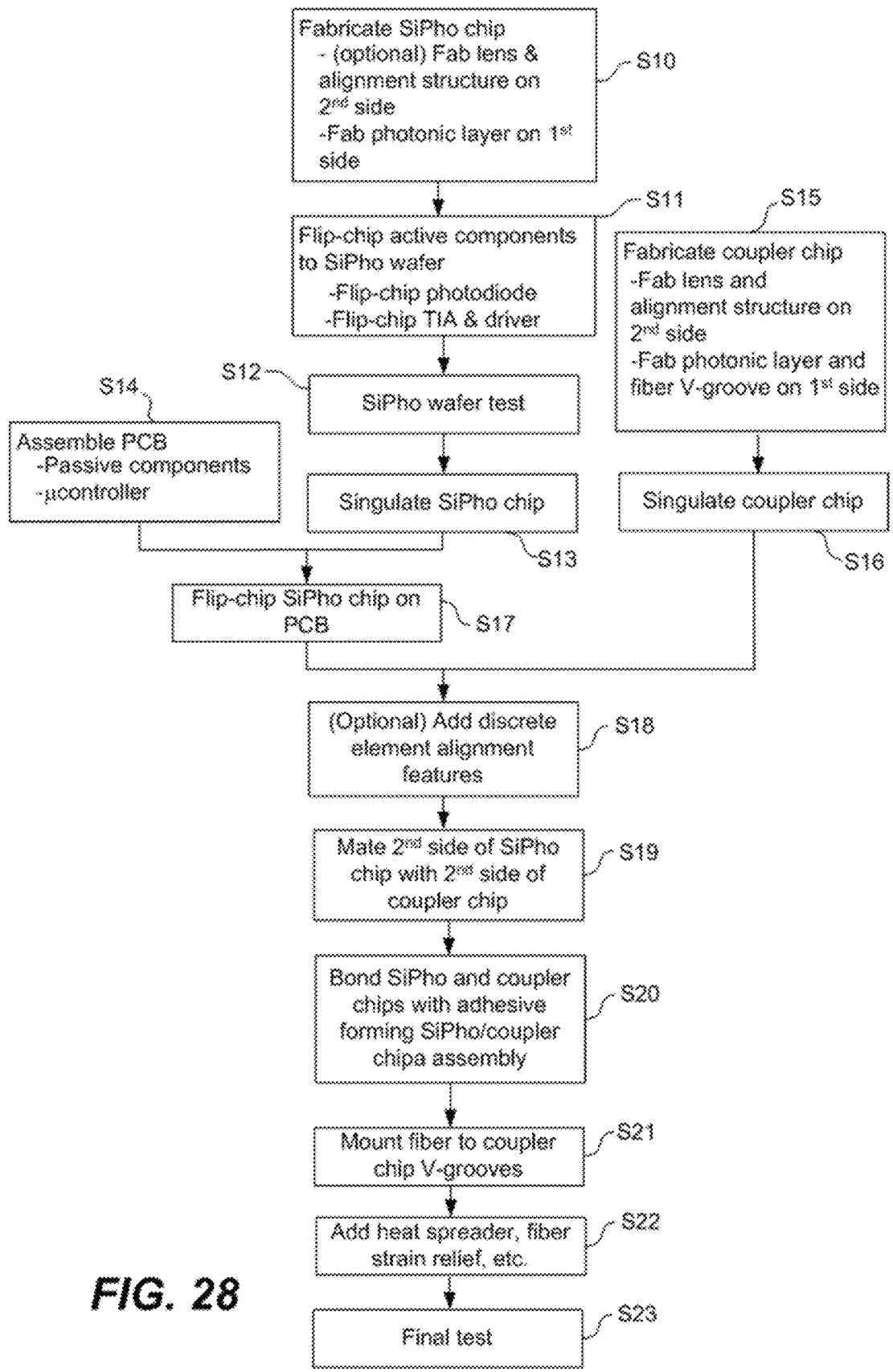
FIGS. 28 and 29 show steps in making a transceiver.
Figure 29:
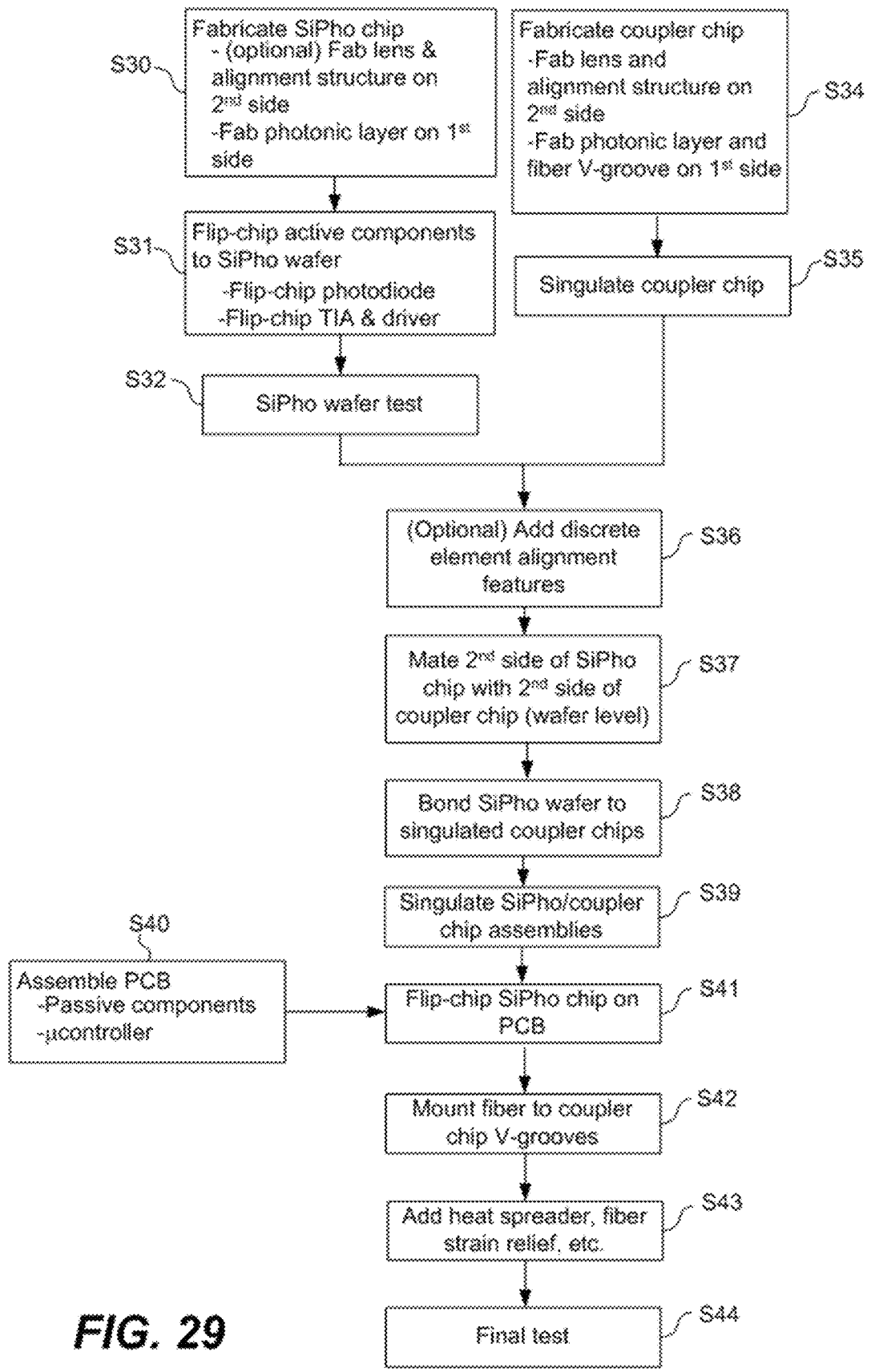

FIGS. 28 and 29 show steps in making a transceiver. In the method shown in FIG. 28, a SiPho chip is attached to a PCB. A coupler chip is then mated to the SiPho chip. Then, optical fibers are attached to the coupler chip.

In step S10, the SiPho chip is fabricated. The SiPho chip includes a photonic layer on a first side. The SiPho chip can include lens and/or alignment features on the second side. The lens and/or alignment features can be etched directly on the second side of the SiPho chip or can be etched on a different wafer, which could be Si or glass, and then bonded to the SiPho chip (either wafer-to-wafer or chip-to-wafer). In step S11, the active devices, including, for example flip-chip photodetectors, a flip-chip TIA, and a flip-chip modulator driver, are attached to the SiPho chip. The SiPho chip is then tested in step S12. In step S13, the wafer with SiPho chip is singulated. In step S14, the PCB is assembled. In step S15 the coupler chip is fabricated. The coupler chip includes a Photonic layer and grooves on a first side. The coupler chip can include lens and/or alignment features on the second side. In step S16, wafer with the coupler chip is singulated.

In step S17, the SiPho chip is connected to the PCB. In step S18, discrete alignment features can be optionally added. In step S19, the SiPho chip and coupler chip are mated. In step S20, the SiPho chip and coupler chip are bonded with adhesive. In step S21, the optical fibers are mounted to grooves in coupler chip. In step S22, heatsink, fiber strain relief, etc. are optionally added. In step S23, final testing of the transceiver is conducted.

The method shown in FIG. 29 relies on wafer-scale fabrication of the coupler chips on the SiPho wafer. Individual coupler chips are mounted to the SiPho chips on the SiPho wafer. The SiPho/coupler wafer is then singulated. Then optical fibers are attached to coupler chips.

In step S30, the SiPho chip is fabricated. The SiPho chip includes a Photonic layer on a first side. The SiPho chip can include lens and/or alignment features on the second side. The lens/and/or alignment features can be etched directly on the second side of the SiPho chip or can be etched on a different wafer, which could be Si or glass, and then bonded to the SiPho chip (either wafer-to-wafer or chip-to-wafer). In step S31, the active devices, including, for example flip-chip photodetectors, flip-chip TIA, and flip-chip modulator driver, are attached to the SiPho chip. The SiPho chip is then tested in step S32. In step S34, the coupler chip is fabricated. The coupler chip includes a Photonic layer and grooves on a first side. The coupler chip can include lens and/or alignment features on the second side. In step S35, wafer with the coupler chip is singulated.

In step S36, discrete alignment features can be optionally added. In step S37, the SiPho chips and the coupler chips are mated to the SiPho chips on the wafer. In step S38, the SiPho chip and coupler chip are bonded. In step S39, the wafer with the SiPho chips and the coupler chips is singulated. In step S40, the PCB is assembled. In Step 41, the SiPho chip is connected to the PCB. In step S42, the optical fibers are mounted to grooves in coupler chip. In step S43, heatsink, fiber strain relief, etc. are optionally added. In step S44, final testing of the transceiver is conducted.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An optical module comprising:
a Silicon Photonics chip that transports a light signal; and
a coupler chip that includes a waveguide, that is attached to the Silicon Photonics chip, and that is configured to connect to a waveguide interconnect so that the light signal is transported along a light path between the Silicon Photonics chip, the coupler chip, and the waveguide interconnect, when the waveguide interconnect is connected to the coupler chip; wherein
the light path in the coupler chip includes:
a guided section that includes the waveguide that guides the light signal; and
an unguided section that does not guide the light signal in any other waveguide structure; and
a cross-sectional size of a beam defined by the light signal is largest at an interface between the Silicon Photonics chip and the coupler chip.

2. The optical module of claim 1, wherein the unguided section extends in a direction of a thickness of the coupler chip.

3. The optical module of claim 2, wherein the unguided section extends between the guided section and a surface of the coupler opposite to the guided section in the direction of the thickness of the coupler chip.

4. The optical module of claim 1, wherein a portion of the light path extends in a direction of a thickness of the Silicon Photonics chip.

5. The optical module of claim 1, wherein the coupler chip includes only one of a wavelength division multiplexer and a wavelength division demultiplexer, or the coupler chip includes both of the wavelength division multiplexer and the wavelength division demultiplexer.

6. The optical module of claim 5, wherein the only one of the wavelength division multiplexer and the wavelength division demultiplexer, or both of the wavelength division multiplexer and the wavelength division demultiplexer include at least one of an Echelle grating, an arrayed waveguide grating, a directional coupler, a dichroic filter, or a resonant interference filter.

7. The optical module of claim 1, wherein a cross-sectional size of a beam defined by the light signal initially increases along the light path and then decreases along the light path.

8. The optical module of claim 1, wherein a photodetector is surface mounted to the Silicon Photonics chip.

9. The optical module of claim 1, wherein a photodetector is included within the Silicon Photonics chip.

10. The optical module of claim 1, wherein a light source is included within the Silicon Photonics chip.

11. The optical module of claim 1, further comprising a light source located outside of the Silicon Photonics chip; wherein
light from the light source is supplied to the Silicon Photonics chip.

12. The optical module of claim 1, wherein the Silicon Photonics chip includes a via in the light path.

13. The optical module of claim 1, wherein the Silicon Photonics chip and the coupler chip are anodically bonded to each other.

14. The optical module of claim 1, wherein the coupler chip includes a borosilicate glass having a coefficient of thermal expansion substantially similar to silicon.

15. The optical module of claim 1, wherein:
the light path includes a first surface of the coupler chip and a second surface of the coupler chip; and
a cross-sectional size of a beam defined by the light signal is different at the first and second surfaces.

16. The optical module of claim 15, wherein at least one of the Silicon Photonics chip and the coupler chip includes a focusing element.

17. The optical module of claim 16, wherein the focusing element is a collimating lens.

18. The optical module of claim 1, wherein the coupler chip only has optical functionality.

19. The optical module of claim 1, further comprising the waveguide interconnect; wherein
the light path extends between the Silicon Photonics chip and the waveguide interconnect.

20. The optical module of claim 1, wherein:
the Silicon Photonics chip includes a photonic layer; and
the photonic layer includes an additional waveguide that transports the light signal.

21. A transceiver comprising:
the optical module of claim 1; and
a printed circuit board; wherein
the Silicon Photonics chip is connected to the printed circuit board.

22. The transceiver of claim 21, further comprising a housing enclosing the Silicon Photonics chip and the coupler chip.

23. The transceiver of claim 22, further comprising a latch that secures the coupler chip in the housing; wherein
the coupler chip is detachable from the housing by unlatching the latch.

24. The optical module of claim 1, wherein:
the guided section guides the light signal along a top surface of the coupler chip; and the unguided section spans a thickness of the coupler chip between a bottom surface and the waveguide.

* * * * *